(12) United States Patent
Suzuki et al.

(10) Patent No.: US 9,313,712 B2
(45) Date of Patent: Apr. 12, 2016

(54) MOBILE APPARATUS AND METHOD

(75) Inventors: Mototsugu Suzuki, Chiyoda-ku (JP); Yousuke Iizuka, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 323 days.

(21) Appl. No.: 13/881,229

(22) PCT Filed: Mar. 30, 2012

(86) PCT No.: PCT/JP2012/058712
§ 371 (c)(1),
(2), (4) Date: Apr. 24, 2013

(87) PCT Pub. No.: WO2012/137690
PCT Pub. Date: Oct. 11, 2012

(65) Prior Publication Data
US 2013/0217395 A1    Aug. 22, 2013

(30) Foreign Application Priority Data

Apr. 4, 2011    (JP) .................................. 2011-082929

(51) Int. Cl.
| H04W 36/30 | (2009.01) |
| H04W 36/00 | (2009.01) |
| H04W 52/02 | (2009.01) |

(52) U.S. Cl.
CPC .......... *H04W 36/30* (2013.01); *H04W 36/0088* (2013.01); *H04W 52/0229* (2013.01)

(58) Field of Classification Search
CPC ............ H04W 36/30; H04W 52/0229; H04W 36/0088
USPC ................................................ 455/436–444
See application file for complete search history.

(56) References Cited

U.S. PATENT DOCUMENTS

| 7,643,547 B2 * | 1/2010 | Ishii et al. ...................... 375/227 |
| 8,346,315 B2 * | 1/2013 | Lindoff et al. ................. 455/574 |

(Continued)

FOREIGN PATENT DOCUMENTS

| CN | 101370227 A | 2/2009 |
| JP | 2009 60601 | 3/2009 |

(Continued)

OTHER PUBLICATIONS

International Search Report Issued Jun. 12, 2012 in PCT/JP12/58712 Filed Mar. 30, 2012.

(Continued)

*Primary Examiner* — Sharad Rampuria
(74) *Attorney, Agent, or Firm* — Oblon, McClelland, Maier & Neustadt, L.L.P.

(57) ABSTRACT

One aspect of the present invention relates to a mobile apparatus, comprising: a first bandwidth measurement unit configured to measure radio conditions of a serving cell and a neighbor cell in a first bandwidth; a second bandwidth measurement unit configured to measure the radio conditions of the serving cell and the neighbor cell in a second bandwidth greater than the first bandwidth; a control unit configured to selectively activate the first bandwidth measurement unit and the second bandwidth measurement unit; and a cell transition unit configured to perform cell transition from the serving cell to the neighbor cell based on the radio conditions of the serving cell and the neighbor cell measured by the first bandwidth measurement unit and the second bandwidth measurement unit, wherein the control unit switches between the first bandwidth measurement unit and the second bandwidth measurement unit at a first switch frequency.

11 Claims, 21 Drawing Sheets

(56) References Cited

U.S. PATENT DOCUMENTS

| | | | |
|---|---|---|---|
| 8,725,220 B2* | 5/2014 | Chueh et al. | 455/574 |
| 8,761,845 B2* | 6/2014 | Takizawa et al. | 455/574 |
| 9,198,069 B2* | 11/2015 | Franklin et al. | |
| 2008/0146231 A1 | 6/2008 | Huang et al. | |
| 2009/0042532 A1* | 2/2009 | Bienas et al. | 455/403 |
| 2009/0191863 A1* | 7/2009 | Kazmi | 455/424 |
| 2010/0298002 A1* | 11/2010 | Masuda et al. | 455/443 |
| 2012/0064903 A1* | 3/2012 | Pani et al. | 455/450 |

FOREIGN PATENT DOCUMENTS

| | | |
|---|---|---|
| JP | 2010 539766 | 12/2010 |
| JP | 2011 502368 | 1/2011 |

OTHER PUBLICATIONS

Extended European Search Report issued Mar. 27, 2015 in Patent Application No. 12767883.7.

Office Action issued Oct. 23, 2015, in Chinese Patent Application No. 201280005277.2 (with English Translation).

* cited by examiner

FIG.1
ADJACENT CELL (LTE 5MHz or 3G)
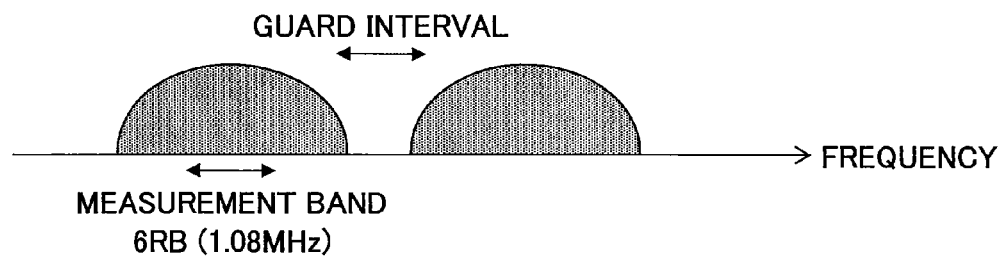
SERVING CELL (LTE 10MHz)
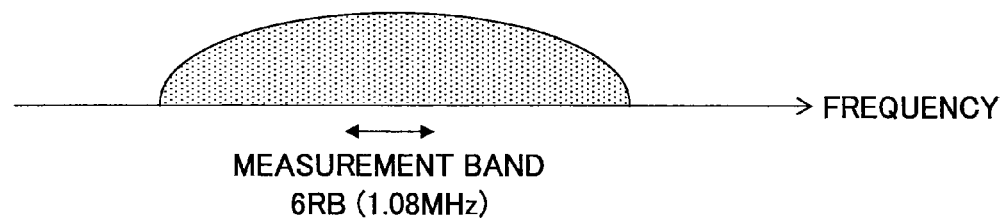

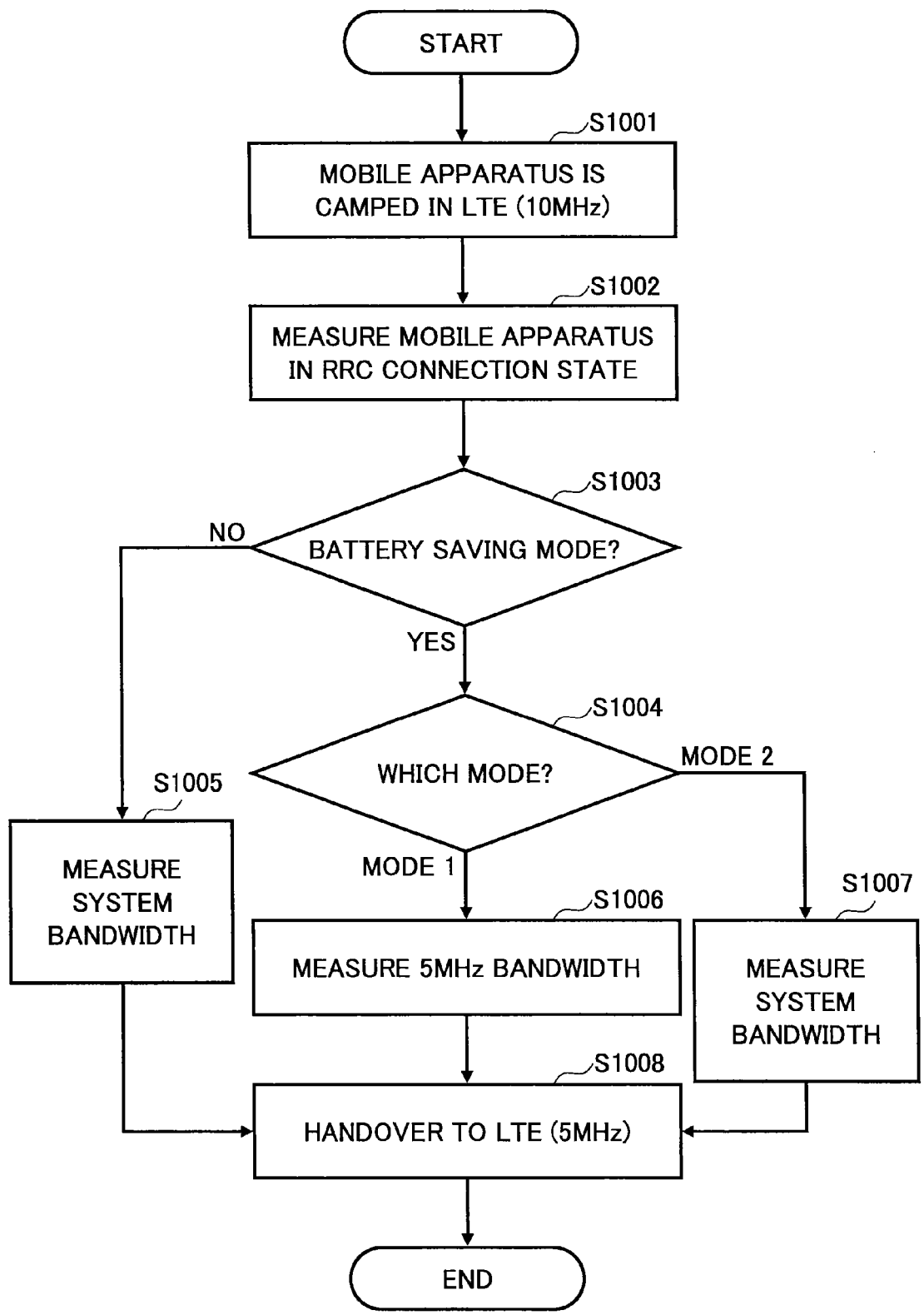

MOBILE APPARATUS AND METHOD

TECHNICAL FIELD

The present invention relates to a radio communication system and more particularly relates to a mobile apparatus and a method for controlling measurement bands in cell transition.

BACKGROUND ART

In a cellular radio communication system, a mobile apparatus periodically measures radio quality in a serving cell, in which the mobile apparatus is camped or served, and a neighbor cell neighboring to the serving cell. For example, upon establishing a connection to the serving cell and detecting a cell having a better radio condition with the serving base station, the mobile apparatus transitions to the detected cell while maintaining the connection with the system (handover). Also, while the mobile apparatus is in an idle state, where the mobile apparatus is not connecting with the serving base station, the mobile apparatus periodically measures the radio conditions of the serving cell and a neighbor cell and upon detecting a cell having a better radio condition, transitions to the detected cell (cell reselection).

In LTE (Long Term Evolution) standard by 3GPP ($3^{rd}$ Generation Partnership Project), it is defined that when a mobile apparatus is measuring radio conditions of a serving cell and a neighbor cell, the mobile apparatus measures a frequency range of at least greater than or equal to 1.06 MHz. In order to avoid measurement in a wide band from the viewpoint of battery saving, a measurement bandwidth of the mobile apparatus may be set to be near 1.06 MHz.

See JP 2011-502368 and JP 2010-539766 for related art, for example.

DISCLOSURE OF INVENTION

Problem to be Solved by the Invention

In the LTE, it is allowed to use cells having different bandwidths such as 5 MHz and 10 MHz. Also, a frequency band (guard interval) of a certain bandwidth for preventing mutual interference between neighbor cells is provided. In this case, there may arise a problem as set forth in transitioning from a 10 MHz cell to a 5 MHz cell, for example. Assuming a case where a mobile apparatus is camped in a serving cell of 10 MHz and measures radio quality of two neighbor cells of 5 MHz in a 1.08 MHz bandwidth corresponding to six resource blocks (RBs) as illustrated in FIG. 1. In the illustrated case, a measurement band of the serving cell corresponds to the guard interval between the two neighbor cells. In this case, the interference estimated based on measurement results of the neighbor cells may be subjected to the guard interval for avoiding the interference, whereby the measurement results may be better than those in an actual communication state. From this reason, if cell transition is performed in reliance on this detection result, the mobile apparatus may fail to connect to a target cell due to the poor radio quality environment in the target cell.

In order to avoid this problem, the radio conditions of the neighbor cells may be measured in a wider measurement band, which is not desirable from the viewpoint of battery saving.

In order to address the above problem, one object of the present invention is to provide a technique for avoiding the connection failure of the mobile apparatus in cell transition while reducing power consumption.

Means for Solving the Problem

One aspect of the present invention relates to a mobile apparatus, comprising: a first bandwidth measurement unit configured to measure radio conditions of a serving cell and a neighbor cell in a first bandwidth; a second bandwidth measurement unit configured to measure the radio conditions of the serving cell and the neighbor cell in a second bandwidth greater than the first bandwidth; a control unit configured to selectively activate the first bandwidth measurement unit and the second bandwidth measurement unit; and a cell transition unit configured to perform cell transition from the serving cell to the neighbor cell based on the radio conditions of the serving cell and the neighbor cell measured by the first bandwidth measurement unit and the second bandwidth measurement unit, wherein the control unit switches between the first bandwidth measurement unit and the second bandwidth measurement unit at a first switch frequency.

Advantage of the Invention

According to the present invention, it is possible to avoid the connection failure of the mobile apparatus in cell transition while reducing power consumption.

BRIEF DESCRIPTION OF DRAWINGS

FIG. 1 is a schematic view for illustrating relationship of measurement bands between cells of different bandwidths;

FIG. 21 is a flow diagram for illustrating a handover operation in the mobile apparatus according to the tenth embodiment of the present invention.

EMBODIMENTS OF THE INVENTION

Embodiments of the present invention are described below with reference to the drawings.

In the accompanying drawings, identical or corresponding symbols are used for components or elements having identical functions, and descriptions thereof are not repeated.

In embodiments stated below, a mobile apparatus utilizes various communication services provided by a radio communication system through radio connection to a base station serving as a component of a radio communication system. Typically, multiple base stations are disposed in the radio communication system to cover a service area of the radio communication system. Each of the base stations covers a certain geographical area and provides such various communication services to the mobile apparatus through the radio connection to the mobile apparatus camped in that area. Although a 5 MHz LTE or a 3G cell and a 10 MHz LTE cell are illustratively described below as cells served by base stations, the present invention is not limited to it. The present invention can be applied to cells having the same bandwidth or different bandwidths.

In the embodiments, the mobile apparatus is typically a user equipment (UE) such as a cellular phone terminal, a smart phone or a personal computer. Typically, the mobile apparatus includes one or more of various hardware resources such as an auxiliary storage device, a memory device, a CPU, a communication device, a display device and an input device. The auxiliary storage device consists of a hard disk, a flash memory and/or others and stores programs or data for implementing various operations as stated below. The memory device consists of a RAM (Random Access Memory) and/or others and upon an activation instruction of the programs, loads and stores programs from the auxiliary storage device. The CPU serves as a processor for processing information and implements the various functions as stated below in accordance with the programs stored in the memory device. The communication device consists of various communication circuits for connecting to a base station for communication with other apparatuses such as a server via a network. The display device and the input device provide a user interface between the mobile apparatus and a user.

A mobile apparatus according to the first embodiment of the present invention is described with reference to FIGS. 2 and 3. In this embodiment, a mobile apparatus camped in a 10 MHz LTE cell in an idle state measures radio conditions of a serving cell and a neighbor cell by switching between a measurement band having a bandwidth of six resource blocks (that is, 1.08 MHz) and a measurement band having a system bandwidth at a predefined cycle and performs cell reselection to the neighbor cell, such as a 5 MHz LTE or a 3G cell, based on the measured radio conditions.

Figure 2:
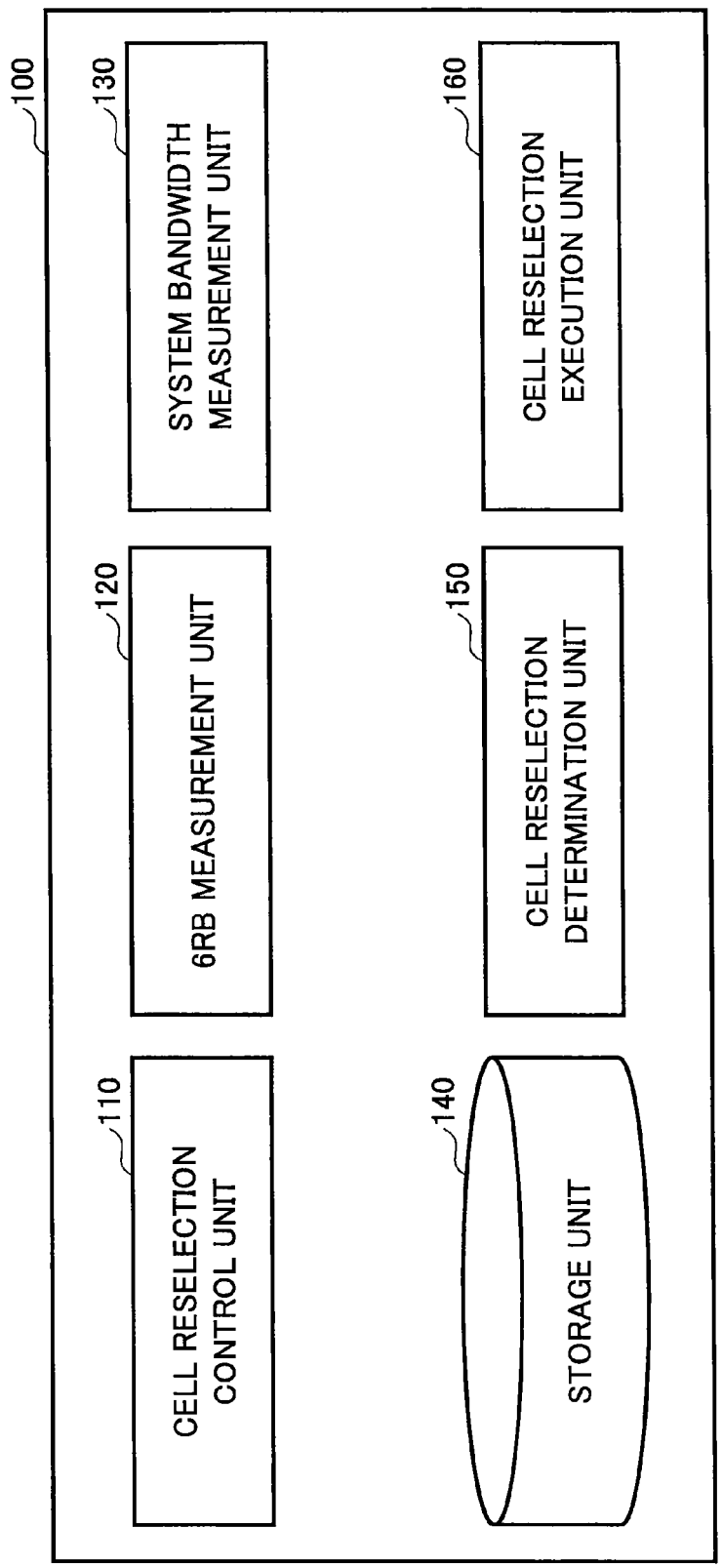
FIG. 2 is a block diagram for illustrating an arrangement of a mobile apparatus according to a first embodiment of the present invention.

FIG. 2 is a block diagram for illustrating an arrangement of a mobile apparatus according to the first embodiment of the present invention. As illustrated in FIG. 2, a mobile apparatus according this embodiment includes a cell reselection control unit 110, a six resource block (6RB) measurement unit 120, a system bandwidth measurement unit 130, a storage unit 140, a cell reselection determination unit 150 and a cell reselection execution unit 160.

The cell reselection control unit 110 controls cell reselection operations in the mobile apparatus 100 being in an idle state as a whole. Specifically, the cell reselection control unit 110 indicates the 6RB measurement unit 120 to measure radio conditions in a serving cell and a neighbor cell in a 1.08 MHz bandwidth in accordance with a predefined measurement cycle. In general, a discontinuous reception (DRX) function can be applied to the mobile apparatus in the idle state for reducing power consumption. Accordingly, if the DRX function is applied to the mobile apparatus 100 in the idle state, the cell reselection control unit 110 may set the measurement cycle depending on the DRX cycle length.

In addition, the cell reselection control unit 110 activates the system bandwidth measurement unit 130 in a portion of measurement occasions specified by the set measurement cycle so as to regularly measure the radio conditions of the serving cell and the neighbor cell in a system bandwidth greater than 1.08 MHz. For example, the cell reselection control unit 110 may activate the system bandwidth measurement unit 130 in every X measurement occasions. The X value for specifying the switch frequency may be a predefined constant or may be dynamically set by the mobile apparatus depending on the radio conditions and/or others.

Upon receiving a measurement indication signal from the cell reselection control unit 110, the 6RB measurement unit 120 measures the radio conditions of the serving cell and the neighbor cell in the 1.08 MHz bandwidth corresponding to six resource blocks (RBs) and supplies the measured radio conditions to the storage unit 140. For example, the 6RB measurement unit 120 measures reception level of reference signals transmitted from individual base stations serving the serving cell and the neighbor cells in the 1.08 MHz bandwidth and determines reception quality RSRQ (Reference Signal Received Quality) based on the measured reception level. The measured 1.08 MHz band is typically set such that the center frequency of that measurement band corresponds to the center frequency of the serving cell.

Upon receiving a measurement indication signal from the cell reselection control unit 110, the system bandwidth measurement unit 130 measures the radio conditions of the serving cell and the neighbor cell in the system bandwidth and supplies the measured radio conditions to the storage unit 140. For example, the system bandwidth measurement unit 130 measures the reception level of reference signals transmitted from individual base stations serving the serving cell and the neighbor cell in the whole system bandwidth and determines the reception quality RSRQ based on the measured reception level.

The storage unit 140 stores measurements results of the radio conditions supplied from the 6RB measurement unit 120 and the system bandwidth measurement unit 130 as well as various data for use in the cell reselection operations. Also, in response to requests from other components in the mobile apparatus 100, the storage unit 140 supplies the stored data.

The cell reselection determination unit 150 determines whether to perform a cell reselection operation from the serving cell to the neighbor cell based on the radio conditions of the serving cell and the neighbor cell measured by the 6RB measurement unit 120 and the system bandwidth measurement unit 130. Upon determining that the cell reselection operation from the serving cell to the neighbor cell is to be initiated, the cell reselection determination unit 150 indicates the cell reselection execution unit 160 to perform the cell reselection. Here, the cell reselection determination unit 150 takes into account measurement results in a wider band such as the system bandwidth measured in every X measurement occasions or a 5 MHz bandwidth for cell reselection determination and performs the cell reselection determination with reference to the measurement result in the 1.08 MHz bandwidth as well as the previous measurement results in the system bandwidth and/or the measurement results in the 5 MHz bandwidth stored in the storage unit 140. Some cell reselection determination criteria can be conceived. As one of the determination criteria, if the RSRQ of the serving cell has been below a predefined threshold $Thresh_{serving, Low}$ (ex. −130 dBm) and the RSRQ of the neighbor cell has been above a predefined threshold $Thresh_{x, Low}$ (ex. −111 dBm) for a duration of longer than or equal to $T_{reselection}$, it is determined that the cell reselection to the neighbor cell is to be performed. Also, as other determination criteria, if the RSRQ of the neighbor cell has exceeded the RSRQ of the serving cell by more than or equal to a predefined threshold for a duration of longer than or equal to $T_{reselection}$, it is determined that the cell reselection to the neighbor cell is to be performed. Also, as other determination criteria, if the RSRQ of the neighbor cell has exceeded a threshold $Thresh_{x, high}$ (ex. −124 dBm) for a duration of longer than or equal to $T_{reselection}$, it is determined that the cell reselection to the neighbor cell is to be performed. Also, as other determination criteria, if the RSRQ of the serving cell has been below the threshold $Thresh_{serving, Low}$ (−130 dBm) and the RSRQ of the neighbor cell been above the threshold $Thresh_{x, Low}$ (−111 dBm) greater than the threshold $Thresh_{serving, Low}$ for a duration of longer than or equal to $T_{reselection}$, it is determined that the cell reselection to the neighbor cell is to be performed. However, the present invention is not limited to these, and any other appropriate cell reselection determination criteria using wider band measurement results may be applied.

Upon receiving an indication to perform the cell reselection from the serving cell to the neighbor cell from the cell reselection determination unit 150, the cell reselection execution unit 160 communicates to base stations serving the serving cell and the neighbor cell and performs the cell reselection to set the neighbor cell as a new serving cell.

Figure 3:
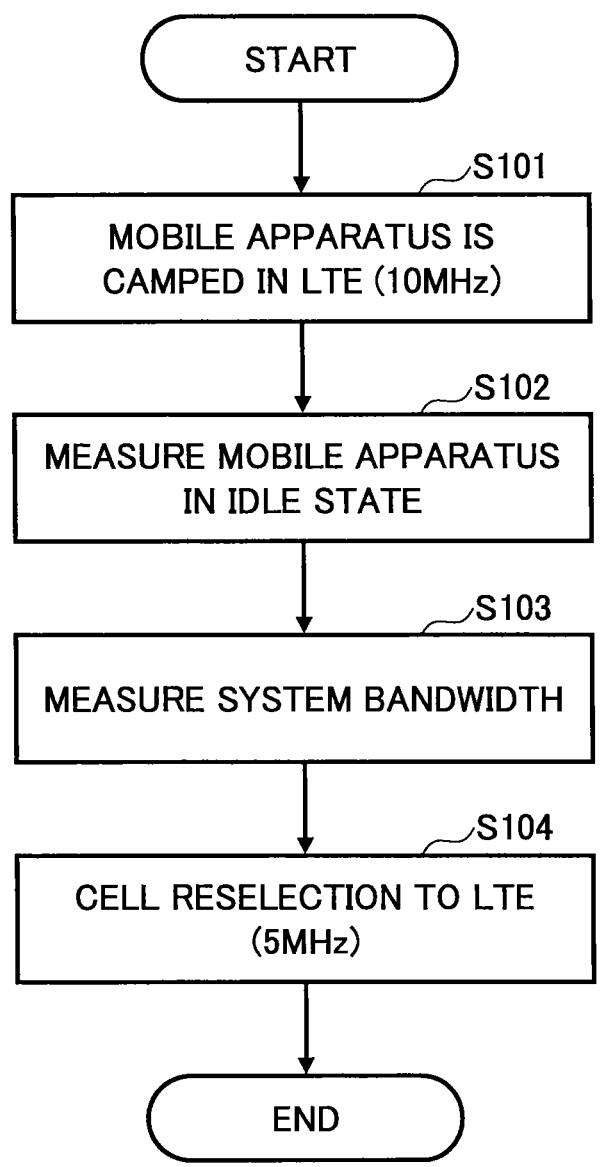
FIG. 3 is a flow diagram for illustrating a cell reselection operation in the mobile apparatus according to the first embodiment of the present invention.

FIG. 3 is a flow diagram for illustrating a cell reselection operation in the mobile apparatus according to the first embodiment of the present invention. As illustrated in FIG. 3, at step S101, the mobile apparatus 100 is camped in a 10 MHz LTE cell and sets that cell as a serving cell.

At step S102, when the mobile apparatus 100 transits to the idle state, the cell reselection control unit 110 measures radio conditions of the serving cell and a neighbor cell in accordance with a predefined measurement cycle. As stated above, the cell reselection control unit 110 causes the 6RB measurement unit 120 to measure the radio conditions of the serving cell and the neighbor cell in a 1.08 MHz bandwidth in each measurement occasion, while the cell reselection control unit 110 causes the system bandwidth measurement unit 130 to measure the radio conditions of the serving cell and the neighbor cell in the system bandwidth in every X measurement occasions. To this end, the cell reselection control unit 110 activates the system bandwidth measurement unit 130 in every X measurement occasions.

At step S103, upon receiving a measurement indication signal from the cell reselection control unit 110, the system bandwidth measurement unit 130 measures the radio conditions of the serving cell and the neighbor cell in the system bandwidth.

At step S104, the cell reselection determination unit 150 determines whether to perform the cell reselection based on the radio conditions of the serving cell and the neighbor cell measured by the 6RB measurement unit 120 and the system bandwidth measurement unit 130. Upon determining that the cell reselection from the serving cell to the neighbor cell is to be performed, the cell reselection determination unit 150 indicates the cell reselection execution unit 160 to perform the cell reselection. Upon receiving this cell reselection indication signal, the cell reselection execution unit 160 performs the cell reselection to the indicated neighbor cell.

Next, a mobile apparatus according to the second embodiment of the present invention is described with reference to FIGS. 4 and 5. In this embodiment, a mobile apparatus presently communicating to a base station in a 10 MHz LTE cell through an established RRC (Radio Resource Control) connection measures radio conditions of a serving cell and a neighbor cell by switching between a measurement band having a bandwidth of six resource blocks (that is, 1.08 MHz) and a measurement band having a system bandwidth at a predefined cycle and initiates handover to the neighbor cell such as a 5 MHz LTE cell or a 3G cell based on the measured radio conditions.

Figure 4:
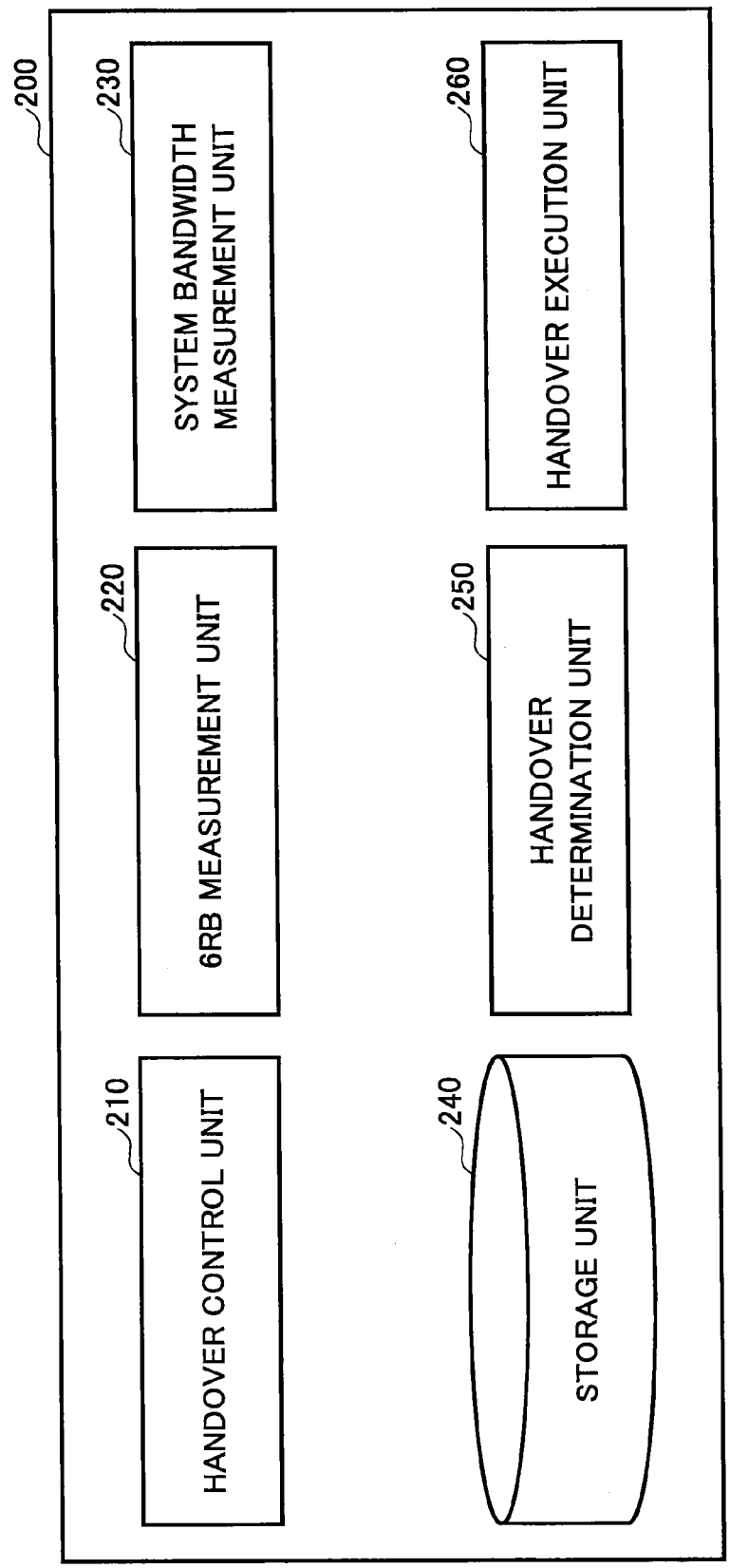
FIG. 4 is a block diagram for illustrating an arrangement of a mobile apparatus according to a second embodiment of the present invention.

FIG. 4 is a block diagram for illustrating an arrangement of a mobile apparatus according to the second embodiment of the present invention. As illustrated in FIG. 4, a mobile apparatus 200 according to this embodiment includes a handover control unit 210, a six resource block (6RB) measurement unit 220, a system bandwidth measurement unit 230, a storage unit 240, a handover determination unit 250 and a handover execution unit 260.

The handover control unit 210 controls handover operations in the mobile apparatus 200 presently communicating to the base station through the established RRC connection as a whole. Specifically, the handover control unit 210 indicates the 6RB measurement unit 220 to measure the radio conditions of the serving cell and the neighbor cell in a bandwidth of 1.08 MHz in accordance with a predefined measurement cycle. In general, mobile apparatuses measure the radio conditions of the presently communicating serving cell and neighbor cells.

In addition, the handover control unit 210 activates the system bandwidth measurement unit 230 in a portion of measurement occasions specified at a set measurement cycle so as to regularly measure the radio conditions of the serving cell and the neighbor cell in the system bandwidth greater than 1.08 MHz. For example, the handover control unit 210 may activate the system bandwidth measurement unit 230 in every X measurement occasions. The X value for specifying the switch frequency may be a predefined constant or may be dynamically set by the mobile apparatus depending on the radio conditions and/or others.

Upon receiving a measurement indication signal from the handover control unit 210, the 6RB measurement unit 220 measures the radio conditions of the serving cell and the neighbor cell in a bandwidth of 1.08 MHz corresponding to six resource blocks (RBs) and supplies the measured radio conditions to the storage unit 240. For example, the 6RM measurement unit 220 measures reception level of reference signals transmitted from individual base stations serving the serving cell and the neighbor cell in the 1.08 MHz bandwidth and determines reception quality RSRQ based on the measured reception level. The measured 1.08 MHz band may be typically set such that the center frequency of the measurement band corresponds to the center frequency of the serving cell.

Upon receiving a measurement indication signal from the handover control unit 210, the system bandwidth measurement unit 230 measures the radio conditions of the serving cell and the neighbor cell in the system bandwidth and supplies the measured radio conditions to the storage unit 240. For example, the system bandwidth measurement unit 230 measures reception level of reference signals transmitted from the individual base stations serving the serving cell and the neighbor cell in the whole system band and determines the reception quality RSRQ based on the measured reception level.

The storage unit 240 stores measurement results of the radio quality supplied from the 6RB measurement unit 220 and the system bandwidth measurement unit 230 as well as various data for use in handover operations. Also, in response to requests from other components in the mobile apparatus 200, the storage unit 240 supplies the stored data.

The handover determination unit 250 determines whether to perform handover from the serving cell to the neighbor cell based on the radio conditions of the serving cell and the neighbor cell measured by the 6RB measurement unit 220 and the system bandwidth measurement unit 230. Upon determining that the handover from the serving cell to the neighbor cell is to be performed, the handover determination unit 250 indicates the handover execution unit 260 to initiate the handover. Here, the handover determination unit 250 takes into account measurement results for a wider band, such as the system bandwidth measured in every X measurement occasion or a 5 MHz bandwidth as stated below, for the handover determination and makes the handover determination with reference to the measurement results of the 1.08 MHz bandwidth and the previous measurement results for the system bandwidth and/or the 5 MHz bandwidth as stored in the storage unit 240. Some handover determination criteria may be conceived. As one of the determination criteria, if RSRQ of the neighbor cell being a handover candidate has exceeded RSRQ of the serving cell by more than or equal to a predefined offset value RSRQRelativeOffset (ex. −5 dBm) for a duration of longer than or equal to $T_{handover}$ it is determined that handover to the neighbor cell is to be performed. Also, as other determination criteria, if the RSRQ of the neighbor cell has been above a predefined threshold RSRQAbsoluteThreshold (ex. −17 dBm) for a duration of longer than or equal to $T_{handover}$, it is determined that the handover to the neighbor cell is to be performed. However, the present invention is not limited to these, and any other appropriate handover determination criteria using wide band measurement results may be applied.

Upon receiving an indication to initiate handover from the serving cell to the neighbor cell from the handover determination unit 250, the handover execution unit 260 communicates to base stations serving the serving cell and the neighbor cell and performs the handover to set the neighbor cell as a new serving cell.

Figure 5:
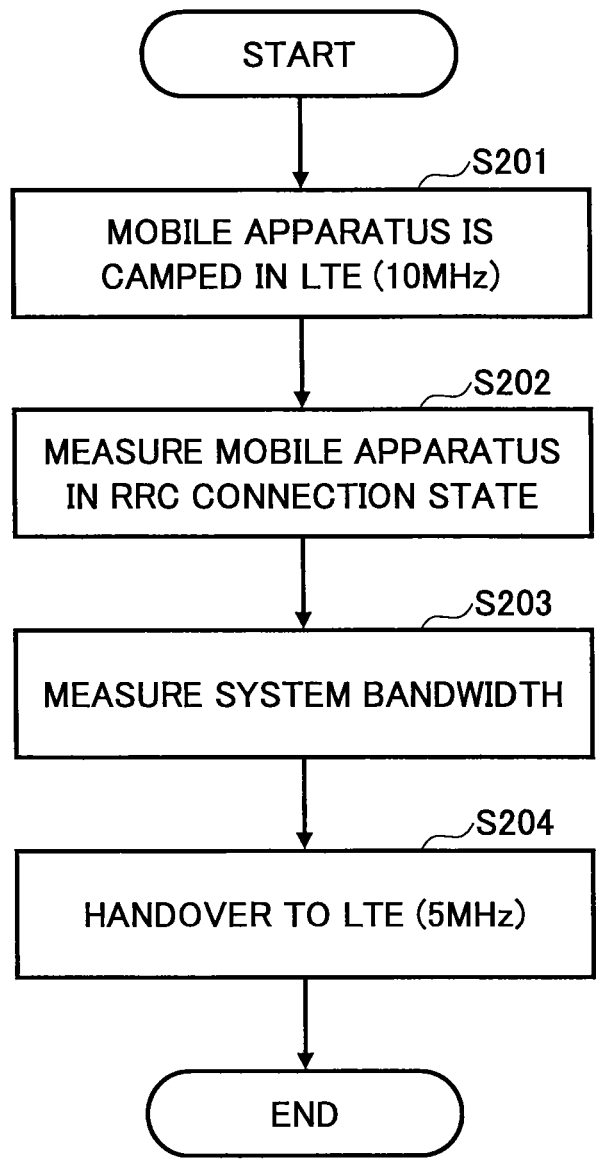
FIG. 5 is a flow diagram for illustrating a handover operation in the mobile apparatus according to the second embodiment of the present invention.

FIG. 5 is a flow diagram for illustrating a handover operation in the mobile apparatus according to the second embodiment of the present invention. As illustrated in FIG. 5, at step S201, the mobile apparatus 200 is camped in a 10 MHz LTE cell and sets that cell as the serving cell.

At step S202, when the mobile apparatus 200 establishes a RRC connection to a base station and transitions to a communication state, the handover control unit 210 measures the radio conditions of the serving cell and the neighbor cell being a handover candidate in accordance with a predefined measurement cycle. As stated above, the handover control unit 210 causes the 6RB measurement unit 220 to measure the radio conditions of the serving cell and the neighbor cell in a 1.08 bandwidth in each measurement occasion, while the handover control unit 210 causes the system bandwidth measurement unit 230 to measure the radio conditions of the serving cell and the neighbor cell in a system bandwidth in every X measurement occasions. To this end, the handover control unit 210 activates the system bandwidth measurement unit 230 in every X measurement occasions.

At step S203, upon receiving a measurement indication signal from the handover control unit 210, the system bandwidth measurement unit 230 measures the radio conditions of the serving cell and the neighbor cell in the system bandwidth.

At step S204, the handover determination unit 250 determines whether to initiate handover based on the radio conditions of the serving cell and the neighbor cell measured by the 6RB measurement unit 220 and the system bandwidth measurement unit 230. Upon determining that the handover from the serving cell to the neighbor cell is to be initiated, the handover determination unit 250 indicates the handover execution unit 260 to initiate the handover. Upon receiving this handover indication signal, the handover execution unit 260 initiates the handover to the indicated neighbor cell.

Next, a mobile apparatus according to the third embodiment of the present invention is described with reference to FIGS. 6 and 7. In this embodiment, a mobile apparatus camped in a 10 MHz LTE cell in an idle state measures radio conditions of a serving cell and a neighbor cell by switching between a measurement band having a bandwidth of six resource blocks (that is, 1.08 MHz) and a measurement band having a system bandwidth or 5 MHz as a wider measurement bandwidth at a predefined cycle and performs cell reselection to the neighbor cell, such as a 5 MHz LTE or a 3G cell, based on the measured communication state. Here, determination as to which of the system bandwidth or the 5 MHz bandwidth is used as the wider measurement band is made based on a remaining amount of a battery of the mobile apparatus.

Figure 6:
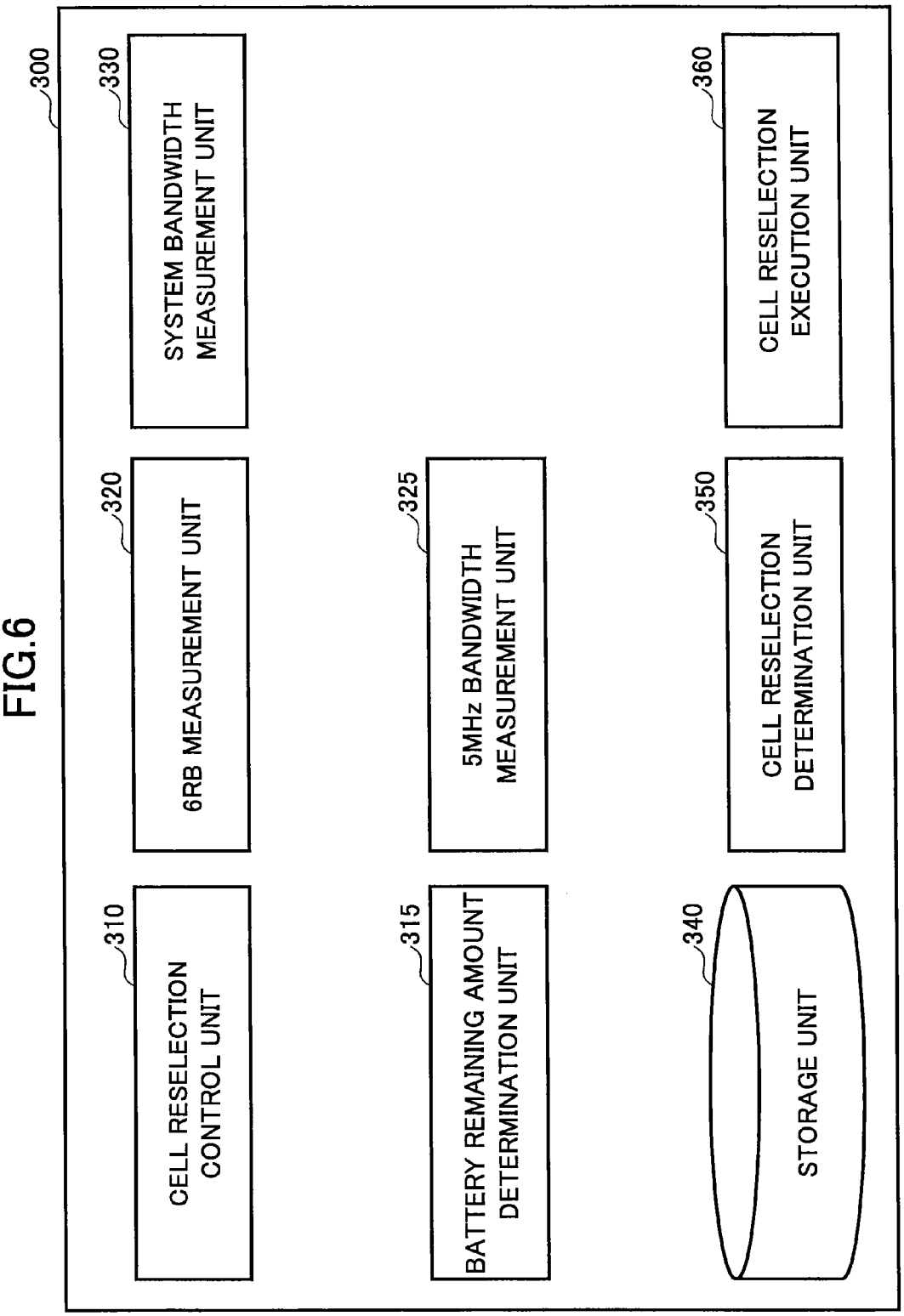
FIG. 6 is a block diagram for illustrating an arrangement of a mobile apparatus according to a third embodiment of the present invention.

FIG. 6 is a block diagram for illustrating an arrangement of a mobile apparatus according to the third embodiment of the present invention. As illustrated in FIG. 6, a mobile apparatus 300 according to this embodiment includes a cell reselection control unit 310, a battery remaining amount determination unit 315, a six resource block (6RB) measurement unit 320, a 5 MHz bandwidth measurement unit 325, a system bandwidth measurement unit 330, a storage unit 340, a cell reselection determination unit 350 and a cell reselection execution unit 360.

The cell reselection control unit 310 controls cell reselection operations in the mobile apparatus 300 in an idle state as a whole. Specifically, the cell reselection control unit 310 indicates the 6RB measurement unit 320 to measure radio conditions of a serving cell and a neighbor cell in a 1.08 bandwidth in accordance with a predefined measurement cycle. In general, a DRX function can be applied to mobile apparatuses in the idle state to reduce power consumption. Accordingly, if the DRX function is applied to the mobile apparatus 300 in the idle state, the cell reselection control unit 310 may set the measurement cycle depending on the DRX cycle length.

In addition, the cell reselection control unit 310 activates the 5 MHz bandwidth measurement unit 325 or the system bandwidth measurement unit 330 in a portion of measurement occasions specified by the set measurement cycle so as to regularly measure the communication state of the serving cell and the neighbor cell in a system bandwidth greater than 1.08 MHz. For example, the cell reselection control unit 310 may activate the 5 MHz bandwidth measurement unit 325 or the system bandwidth measurement unit 330 in every X measurement occasions. The X value for specifying the switch frequency may be a predefined constant or may be dynamically set by the mobile apparatus depending on the radio conditions and/or others. Determination as to which of the 5 MHz bandwidth measurement unit 325 and the system bandwidth measurement unit 330 is to be activated is made based on the battery remaining amount in the mobile apparatus 300. In general, it is desirable to use measurement results in the system bandwidth in the cell reselection determination, but the measurement in the system bandwidth requires much power consumption. On the other hand, even if measurement results in the 5 MHz bandwidth are used, interference can be estimated at an acceptable accuracy. Accordingly, when the battery remaining amount of the mobile apparatus 300 is small, the cell reselection determination is made based on the measurement results in the 5 MHz bandwidth.

Upon receiving a request to determine the battery remaining amount from the cell reselection control unit 310, the battery remaining amount determination unit 315 detects the battery remaining amount of the mobile apparatus 300 to determine whether the detected battery remaining amount is less than or equal to a predefined threshold Y %. The Y value may be a predefined constant or may be dynamically set by the mobile apparatus depending on the radio conditions and/or others. If the detected battery remaining amount is greater than Y %, the battery remaining amount determination unit 315 notifies the cell reselection control unit 310 that the detected battery remaining amount is greater than Y %. Upon receiving this notification, the cell reselection control unit 310 determines that the battery remaining amount is sufficient to measure the system bandwidth and activates the system bandwidth measurement unit 330 to measure the radio conditions of the serving cell and the neighbor cell in the system bandwidth. On the other hand, if the detected battery remaining amount is less than or equal to Y %, the battery remaining amount determination unit 315 notifies the cell reselection control unit 310 that the detected battery remaining amount is less than or equal to Y %. Upon receiving this notification, the cell reselection control unit 310 determines that the battery remaining amount is not sufficient to measure the system bandwidth and activates the 5 MHz bandwidth measurement unit 325 to measure the radio conditions of the serving cell and the neighbor cell in the 5 MHz bandwidth.

Upon receiving a measurement indication signal from the cell reselection control unit 310, the 6RB measurement unit 320 measures the radio conditions of the serving cell and the neighbor cell in a 1.08 MHz bandwidth corresponding to six resource blocks (RBs) and supplies the measured radio conditions to the storage unit 340. For example, the 6RB measurement unit 320 measures reception levels of reference signals transmitted from individual base stations serving the serving cell and the neighbor cell in the 1.08 MHz bandwidth and determines reception quality RSRQ based on the measured reception level. The measured 1.08 MHz band is typically set such that the center frequency of the measurement band is the center frequency of the serving cell.

Upon receiving a measurement indication signal from the cell reselection control unit 310, the 5 MHz bandwidth measurement unit 325 measures the radio conditions of the serving cell and the neighbor cell in a 5 MHz bandwidth and supplies the measured radio conditions to the storage unit 340. For example, the 5 MHz bandwidth measurement unit 325 receives reception level of reference signals transmitted from individual base stations serving the serving cell and the neighbor cell in the 5 MHz bandwidth and determines reception quality RSRQ based on the measured reception level. The measured 5 MHz band is typically set such that the center frequency of the measurement band corresponds to the center frequency of the serving cell.

Upon receiving a measurement indication signal from the cell reselection control unit 310, the system bandwidth measurement unit 330 measures the radio conditions of the serving cell and the neighbor cell in the system bandwidth and supplies the measured radio conditions to the storage unit 340. For example, the system bandwidth measurement unit 330 measures the reception level of reference signals transmitted from individual base stations serving the serving cell and the neighbor cell in the whole system bandwidth and determines the reception quality RSRQ based on the measured reception level.

The storage unit 340 stores measurement results of the radio conditions supplied from the 6RB measurement unit 320, the 5 MHz bandwidth measurement unit 325 and the system bandwidth measurement unit 330 and various data for use in cell reselection operations. Also, in response to requests from other components in the mobile apparatus 300, the storage unit 340 supplies the stored data.

The cell reselection determination unit 350 uses the above-stated cell reselection determination criteria to determine whether to perform the cell reselection from the serving cell to the neighbor cell based on the radio conditions of the serving cell and the neighbor cell measured by the 6RB measurement unit 320, the 5 MHz bandwidth measurement unit 325 and the system bandwidth measurement unit 330. Upon determining that the cell reselection from the serving cell to the neighbor cell is to be performed, the cell reselection determination unit 350 indicates the cell reselection execution unit 360 to initiate the cell reselection.

Upon receiving an indication to initiate the cell reselection from the serving cell to the neighbor cell from the cell reselection determination unit 350, the cell reselection execution unit 360 communicates to the base stations serving the serving cell and the neighbor cell and performs the cell reselection to set the neighbor cell as a new serving cell.

Figure 7:
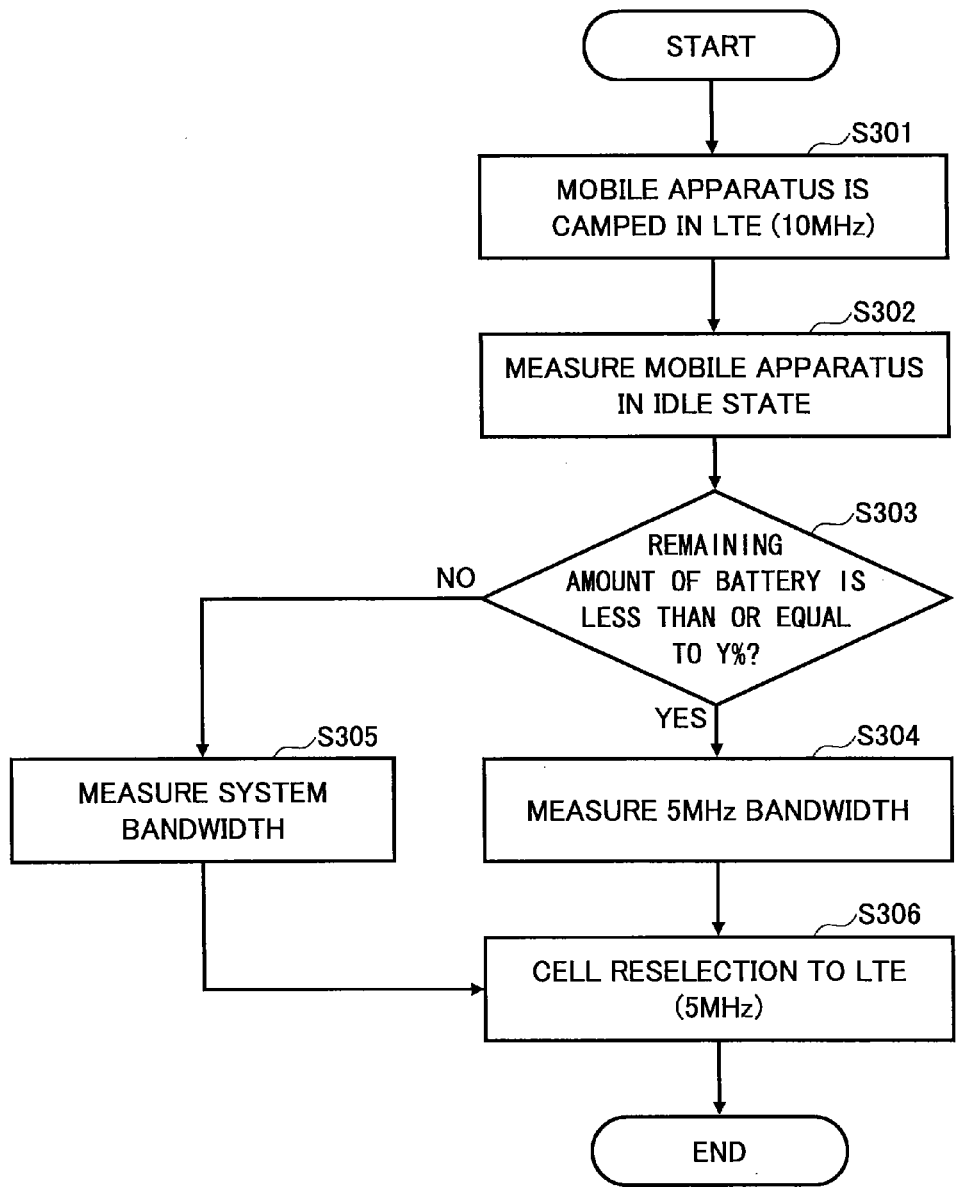
FIG. 7 is a flow diagram for illustrating a cell reselection operation in the mobile apparatus according to the third embodiment of the present invention.

FIG. 7 is a flow diagram for illustrating a cell reselection operation in a mobile apparatus according to the third embodiment of the present invention. As illustrated in FIG. 7, at step S301, the mobile apparatus 300 is camped in a 10 MHz LTE cell and sets that cell as a serving cell.

At step S302, when the mobile apparatus 300 transitions in an idle state, the cell reselection control unit 310 measures radio conditions of the serving cell and a neighbor cell in accordance with a predefined measurement cycle. As stated above, the cell reselection control unit 310 causes the 6RB measurement unit 320 to measure the radio conditions of the serving cell and the neighbor cell in a 1.08 bandwidth in each measurement occasion, while the cell reselection control unit 310 causes the 5 MHz bandwidth measurement unit 325 or the system bandwidth measurement unit 330 to measure the radio conditions of the serving cell and the neighbor cell in a 5 MHz bandwidth or a system bandwidth in every X measurement occasions. Determination as to which of the 5 MHz bandwidth measurement unit 325 and the system bandwidth measurement unit 330 is to be activated is made based on the battery remaining amount in the mobile apparatus 300. To this end, the cell reselection control unit 310 inquires from the battery remaining amount determination unit 315 whether the battery remaining amount is sufficient in every X measurement occasions and activates the 5 MHz bandwidth measurement unit 325 or the system bandwidth measurement unit 330 depending on the detected battery remaining amount.

At step S303, upon receiving a determination indication signal from the cell reselection control unit 310, the battery remaining amount determination unit 315 detects the battery remaining amount of the mobile apparatus 300, determines whether the detected battery remaining amount is less than or equal to a predefined threshold Y %, and indicates the determination result to the cell reselection control unit 310. If the detected battery remaining amount is less than or equal to Y % (S303: YES), the cell reselection control unit 310 determines that the battery remaining amount of the mobile apparatus 300 is not sufficient and activates the 5 MHz bandwidth measurement unit 325. On the other hand, if the detected battery remaining amount is greater than Y % (S303: NO), the cell reselection control unit 310 determines that the battery remaining amount of the mobile apparatus 300 is sufficient and activates the system bandwidth measurement unit 330.

At step S304, upon receiving a measurement indication signal from the cell reselection control unit 310, the 5 MHz bandwidth measurement unit 325 measures the radio conditions of the serving cell and the neighbor cell in a 5 MHz bandwidth.

At step S305, upon receiving a measurement indication signal from the cell reselection control unit 310, the system bandwidth measurement unit 330 measures the radio conditions of the serving cell and the neighbor cell in the system bandwidth.

At step S306, the cell reselection determination unit 350 determines whether to initiate cell reselection based on the radio conditions of the serving cell and the neighbor cell measured by the 6RB measurement unit 320, the 5 MHz bandwidth measurement unit 325 and the system bandwidth measurement unit 330. Upon determining that the cell reselection from the serving cell to the neighbor cell is to be initiated, the cell reselection determination unit 350 indicates the cell reselection execution unit 360 to perform the cell reselection. Upon receiving this cell reselection indication signal, the cell reselection execution unit 360 performs the cell reselection to the indicated neighbor cell.

Next, a mobile apparatus according to the fourth embodiment of the present invention is described with reference to FIGS. 8 and 9. In this embodiment, a mobile apparatus presently communicating to a base station in a 10 MHz LTE cell through an established RRC connection measures radio conditions of a serving cell and a neighbor cell by switching between a measurement band having a bandwidth of six resource blocks (that is, 1.08 MHz) and a wider system bandwidth or a 5 MHz measurement band at a predefined cycle and performs handover to the neighbor cell such as a 5 MHz LTE cell or a 3G cell based on the measured radio conditions. Here, determination as to which of the system bandwidth and the 5 MHz bandwidth is used as the measurement band is made depending on the battery remaining amount of the mobile apparatus.

Figure 8:
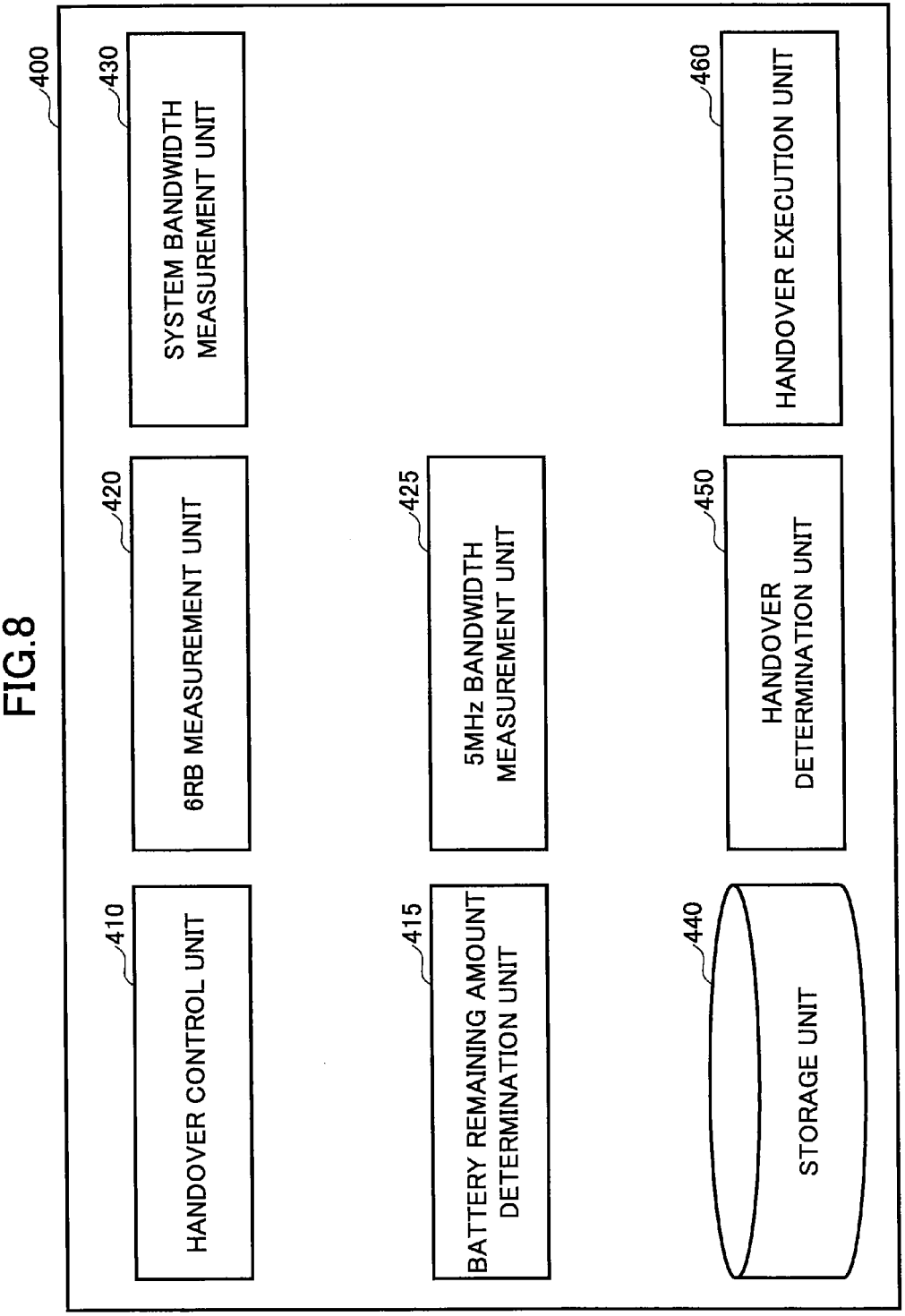
FIG. 8 is a block diagram for illustrating an arrangement of a mobile apparatus according to a fourth embodiment of the present invention.

FIG. 8 is a block diagram for illustrating an arrangement of a mobile apparatus according to the fourth embodiment of the present invention. As illustrated in FIG. 8, a mobile apparatus 400 according to this embodiment includes a handover control unit 410, a battery remaining amount determination unit 415, a six resource block (6RB) measurement unit 420, a 5 MHz bandwidth measurement unit 425, a system bandwidth measurement unit 430, a storage unit 440, a handover determination unit 450 and a handover execution unit 460.

The handover control unit 410 controls handover operations in the mobile apparatus 400 presently communicating to a base station through an established RRC connection as a whole. Specifically, the handover control unit 410 indicates the 6RB measurement unit 420 to measure radio conditions of a serving cell and a neighbor cell in a 1.08 MHz bandwidth in accordance with a predefined measurement cycle. In general, mobile apparatuses measure the radio conditions of the presently communicating serving cell and neighbor cells at a predefined measurement cycle.

Furthermore, the handover control unit 410 activates the 5 MHz bandwidth measurement unit 425 or the system bandwidth measurement unit 430 in a portion of measurement occasions specified at a set measurement cycle so as to regularly measure the radio conditions of the serving cell and the neighbor cell in a system bandwidth greater than 1.08 MHz. For example, the handover control unit 410 may activate the 5 MHz bandwidth measurement unit 425 or the system bandwidth measurement unit 430 in every X measurement occasions. The X value for specifying the switch frequency may be a predefined constant or may be dynamically set by the mobile apparatus depending on the radio conditions and/or others. Determination as to which of the 5 MHz bandwidth measurement unit 425 and the system bandwidth measurement unit 430 is to be activated is made based on the battery remaining amount in the mobile apparatus 400. In general, it is desirable to use measurement results in the system bandwidth in handover determination, but the measurement in the system bandwidth requires much power consumption. On the other hand, even if measurement results in the 5 MHz bandwidth are used, interference can be estimated at an acceptable accuracy. Accordingly, if the battery remaining amount of the mobile apparatus 400 is small, the measurement results in the 5 MHz bandwidth are used to determine whether to perform the handover.

Upon receiving a request to determine the battery remaining amount from the handover control unit 410, the battery remaining amount determination unit 415 detects the battery remaining amount of the mobile apparatus 400 and determines whether the detected battery remaining amount is less than or equal to a predefined threshold Y %. The Y value may be a predefined constant or may be dynamically set by the mobile apparatus depending on the radio conditions and/or others. If the detected battery remaining amount is greater than Y %, the battery remaining amount determination unit 415 notifies the handover control unit 410 that the detected battery remaining amount is greater than Y %. Upon receiving this notification, the handover control unit 410 determines that the battery remaining amount is sufficient to measure the system bandwidth and activates the system bandwidth measurement unit 430 to measure the radio conditions of the serving cell and the neighbor cell in the system bandwidth. On the other hand, if the detected battery remaining amount is less than or equal to Y %, the battery remaining amount determination unit 415 notifies the handover control unit 410 that the detected battery remaining amount is less than or equal to Y %. Upon receiving this notification, the handover control unit 410 determines that the battery remaining amount is not sufficient to measure the system bandwidth and activates the 5 MHz bandwidth measurement unit 425 to measure the radio conditions of the serving cell and the neighbor cell in a 5 MHz bandwidth.

Upon receiving a measurement indication signal from the handover control unit 410, the 6RB measurement unit 420 measures the radio conditions of the serving cell and the neighbor cell in a 5 MHz bandwidth and supplies the measured radio conditions in the storage unit 440. For example, the 5 MHz bandwidth measurement unit 425 measures reception level of reference signals transmitted from individual base stations serving the serving cell and the neighbor cell in a 5 MHz bandwidth and determines reception quality RSRQ based on the measured reception level. The measured 10.8 MHz band is typically set such that the center frequency of the measurement band corresponds to the center frequency of the serving cell.

Upon receiving a measurement indication signal from the handover control unit 410, the 5 MHz bandwidth measurement unit 425 measures the radio conditions of the serving cell and the neighbor cell in a 5 MHz bandwidth and supplies the measured radio conditions to the storage unit 440. For example, the 5 MHz bandwidth measurement unit 425 measures reception level of reference signals transmitted from individual base stations serving the serving cell and the neighbor cell in a 5 MHz bandwidth and determines reception quality RSRQ based on the measured reception level. The measured 5 MHz band is typically set such that the center frequency of the measurement band corresponds to the center frequency of the serving cell.

Upon receiving a measurement indication signal from the handover control unit 410, the system bandwidth measurement unit 430 measures the radio conditions of the serving cell and the neighbor cell in the system bandwidth and supplies the measured radio conditions to the storage unit 440. For example, the system bandwidth measurement unit 430 measures reception level of reference signals transmitted from individual base stations serving the serving cell and the neighbor cell in the whole system band and determines reception quality RSRQ based on the measured reception level.

The storage unit 440 stores measurement results of the radio conditions supplied from the 6RB measurement unit 420, the 5 MHz bandwidth measurement unit 425 and the system bandwidth measurement unit 430 and various data for use in handover operations. Also, in response to requests from other components in the mobile apparatus 400, the storage unit 440 supplies the stored data.

The handover determination unit 450 uses the above-stated handover determination criteria to determine whether to perform handover from the serving cell to the neighbor cell based on the radio conditions of the serving cell and the neighbor cell measured by the 6RB measurement unit 420, the 5 MHz bandwidth measurement unit 425 and the system bandwidth measurement unit 430. Upon determining that the handover from the serving cell to the neighbor cell is to be initiated, the handover determination unit 450 indicates the handover execution unit 460 to initiate the handover.

Upon receiving an indication to initiate the handover from the serving cell to the neighbor cell from the handover determination unit 450, the handover execution unit 460 communicates to base stations serving the serving cell and the neighbor cell and performs the handover to set the neighbor cell as a new serving cell.

Figure 9:
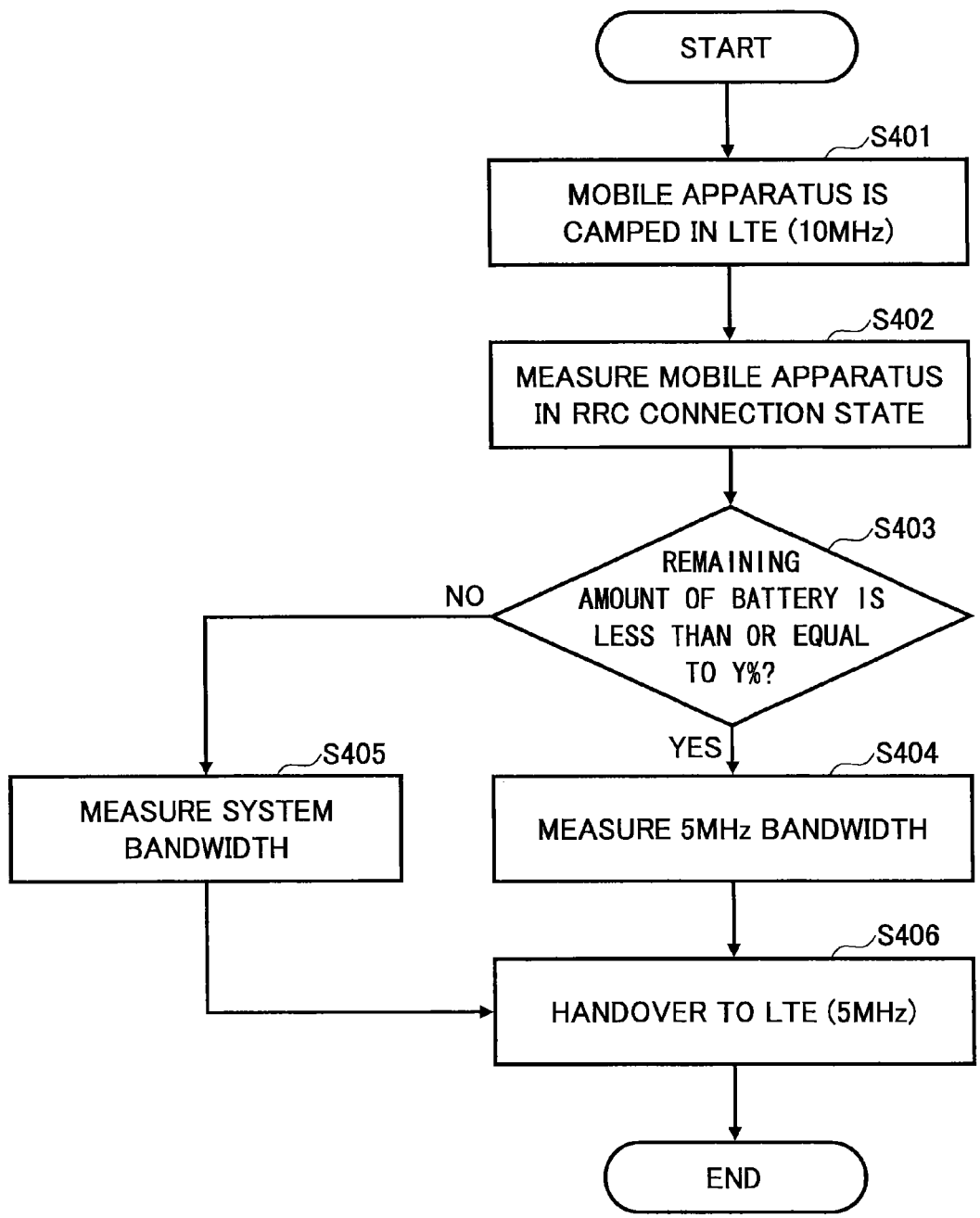
FIG. 9 is a flow diagram for illustrating a handover operation in the mobile apparatus according to the fourth embodiment of the present invention.

FIG. 9 is a flow diagram for illustrating a handover operation in the mobile apparatus according to the fourth embodiment of the present invention. As illustrated in FIG. 9, at step S401, the mobile apparatus 400 is camped in a 10 MHz LTE cell and sets that cell as a serving cell.

At step S402, when the mobile apparatus 400 establishes a RRC connection to a base station and transitions to a communication state, the handover control unit 410 measures radio conditions of the serving cell and the neighbor cell being a handover candidate cell in accordance with a predefined measurement cycle. As stated above, the handover control unit 410 causes the 6RB measurement unit 420 to measure the radio conditions of the serving cell and the neighbor cell in a 1.08 MHz bandwidth in each measurement occasion, while the handover control unit 410 causes the 5 MHz bandwidth measurement unit 425 or the system bandwidth measurement unit 430 to measure the radio conditions of the serving cell and the neighbor cell in a 5 MHz bandwidth or the system bandwidth. Determination as to which of the 5 MHz bandwidth measurement unit 425 and the system bandwidth measurement unit 430 is to be activated is made based on the battery remaining amount of the mobile apparatus 400. To this end, the handover control unit 410 inquires from the battery remaining amount determination unit 415 whether the battery remaining amount is sufficient in every X measurement occasions and activates the 5 MHz bandwidth measurement unit 425 or the system bandwidth measurement unit 430 depending on the detected battery remaining amount.

At step S403, upon receiving a determination indication signal from the handover control unit 410, the battery remaining amount determination unit 415 detects a battery remaining amount in the mobile apparatus 400, determines whether the detected battery remaining amount is less than or equal to a predefined threshold Y % and indicates the determination result to the handover control unit 410. If the detected battery remaining amount is less than or equal to Y % (S403: YES), the handover control unit 410 determines that the battery remaining amount of the mobile apparatus 400 is not sufficient and activates the 5 MHz bandwidth measurement unit 425. On the other hand, if the detected battery remaining amount is greater than Y % (S403: NO), the handover control unit 410 determines that the battery remaining amount of the mobile apparatus 400 is sufficient and activates the system bandwidth measurement unit 430.

At step S404, upon receiving a measurement indication signal from the handover control unit 410, the 5 MHz bandwidth measurement unit 430 measures the radio conditions of the serving cell and the neighbor cell in the 5 MHz bandwidth.

At step S405, upon receiving a measurement indication signal from the handover control unit 410, the system bandwidth measurement unit 430 measures the radio conditions of the serving cell and the neighbor cell in the system bandwidth.

At step S406, the handover determination unit 450 determines whether to initiate the handover based on the radio conditions of the serving cell and the neighbor cell measured by the 6RB measurement unit 420, the 5 MHz bandwidth measurement unit 425 and the system bandwidth measurement unit 430. Upon determining that the handover from the serving cell to the neighbor cell is to be initiated, the handover determination unit 450 indicates the handover execution unit 460 to initiate the handover. Upon receiving this handover indication signal, the handover execution unit 460 performs the handover to the indicated neighbor cell.

Next, a mobile apparatus according to the fifth embodiment of the present invention is described with reference to FIGS. 10 and 11. In this embodiment, a mobile apparatus camped in a 10 MHz LTE cell in an idle state measures radio conditions of a serving cell and a neighbor cell by switching between a measurement band having a bandwidth of six resource blocks (that is, 1.08 MHz) and a wider system bandwidth or a 5 MHz measurement band at a predefined cycle and initiates cell reselection to the neighbor cell such as a 5 MHz LTE cell or a 3G cell based on the measured radio conditions. Here, determination as to which of the system bandwidth and the 5 MHz bandwidth is used as the wider measurement band is made based on whether the mobile apparatus is set to a battery saving mode.

Figure 10:
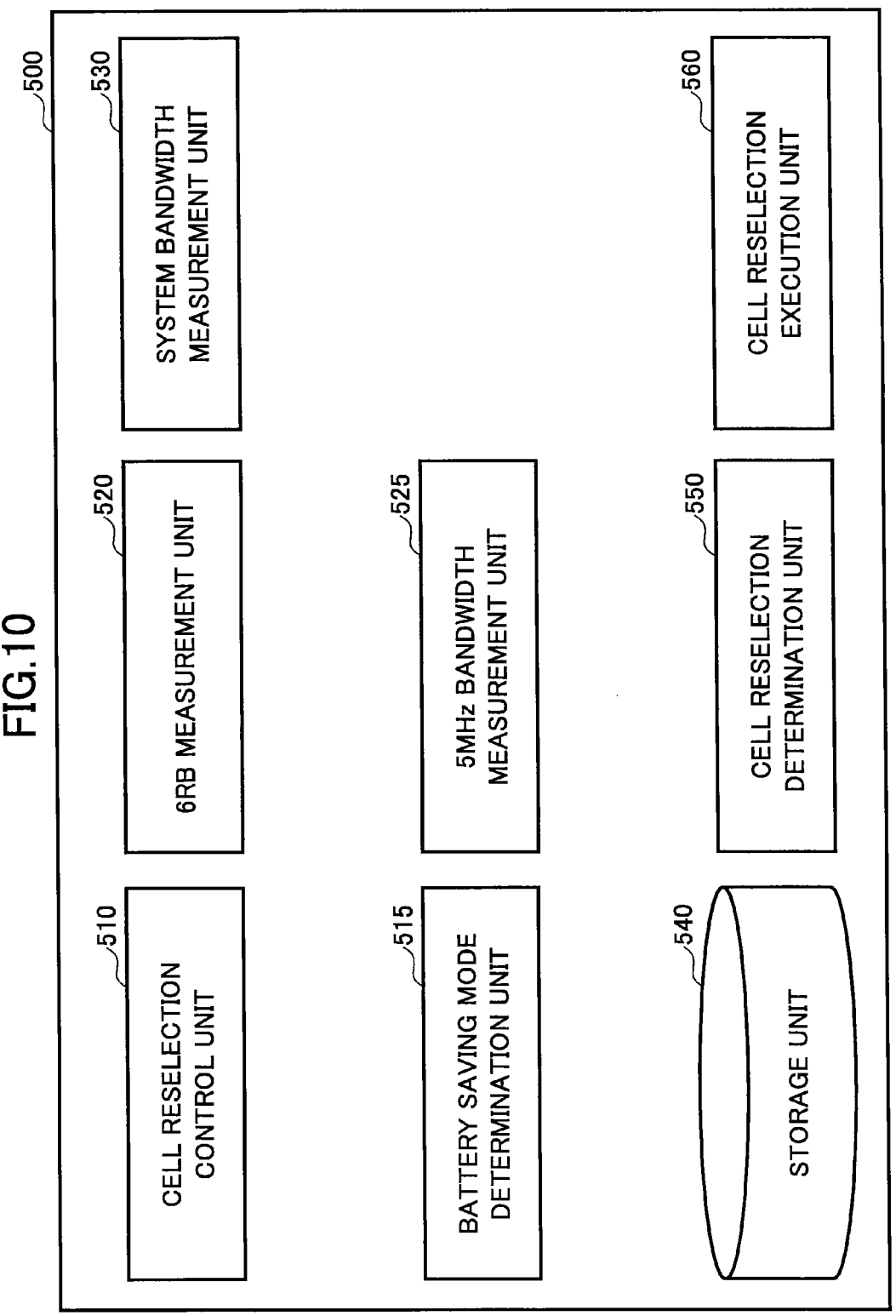
FIG. 10 is a block diagram for illustrating an arrangement of a mobile apparatus according to a fifth embodiment of the present invention.

FIG. 10 is a block diagram for illustrating an arrangement of a mobile apparatus according to the fifth embodiment of the present invention. As illustrated in FIG. 10, a mobile apparatus according to this embodiment includes a cell reselection control unit 510, a battery saving mode determination unit 515, a six resource block (6RB) measurement unit 520, a 5 MHz bandwidth measurement unit 525, a system bandwidth measurement unit 530, a storage unit 540, a cell reselection determination unit 550 and a cell reselection execution unit 560.

The cell reselection control unit 510 controls cell reselection operations in the mobile apparatus 500 being in an idle state as a whole. Specifically, the cell reselection control unit 510 indicates the 6RB measurement unit 520 to measure radio conditions of a serving cell and a neighbor cell in a 1.08 MHz bandwidth in accordance with a predefined measurement cycle. In general, a DRX function can be applied to mobile apparatuses in the idle state to reduce power consumption. Accordingly, if the DRX function is applied to the mobile apparatus 500 in the idle state, the cell reselection control unit 510 may set the measurement cycle depending on the DRX cycle length.

Furthermore, the cell reselection control unit 510 activates the 5 MHz bandwidth measurement unit 525 or the system bandwidth measurement unit 530 in a portion of measurement occasions specified by the set measurement cycle so as to regularly measure the communication state of the serving cell and the neighbor cell in a system bandwidth greater than 1.08 MHz. For example, the cell reselection control unit 510 may activate the 5 MHz bandwidth measurement unit 525 or the system bandwidth measurement unit 530 in every X measurement occasions. The X value for specifying the switch frequency may be a predefined constant or may be dynamically set by the mobile apparatus depending on the radio conditions and/or others. Determination as to which of the 5 MHz bandwidth measurement unit 525 and the system bandwidth measurement unit 530 is to be activated is made based on whether the mobile apparatus 500 is set to the battery saving mode. In general, it is desirable to use measurement results in the system bandwidth in cell reselection determination, but the measurement in the system bandwidth requires much power consumption. On the other hand, even if the measurement results in the 5 MHz bandwidth are used, interference can be estimated at an acceptable accuracy. Accordingly, the cell reselection is determined based on the measurement results in the 5 MHz bandwidth.

Upon receiving a request to determine whether the mobile apparatus 500 is set to the battery saving mode from the cell reselection control unit 510, the battery saving mode determination unit 515 determines whether a power mode of the mobile apparatus 500 is set to the battery saving mode. The power mode of the mobile apparatus 500 may be set by a user or may be dynamically set by the mobile apparatus 500 depending on the radio conditions. If the battery saving mode is set, the battery saving mode determination unit 515 notifies the cell reselection control unit 510 that the mobile apparatus 500 is set to the battery saving mode. Upon receiving this notification, the cell reselection control unit 510 activates the 5 MHz bandwidth measurement unit 525 to measure the radio conditions of the serving cell and the neighbor cell in a 5 MHz bandwidth for reduction in power required to measure the radio conditions. On the other hand, if the battery saving mode is not set, the battery saving mode determination unit 515 notifies the cell reselection control unit 510 that the mobile apparatus 500 is not set to the battery saving mode. Upon receiving this notification, the cell reselection control unit 510 activates the system bandwidth measurement unit 530 to measure the radio conditions of the serving cell and the neighbor cell in the system bandwidth for the interference measurement at a higher accuracy.

Upon receiving a measurement indication signal from the cell reselection control unit 510, the 6RB measurement unit 520 measures the radio conditions of the serving cell and the neighbor cell in a 1.08 bandwidth corresponding to six resource blocks (RBs) and supplies the measured radio conditions to the storage unit 540. For example, the 6RB measurement unit 520 measures reception level of reference signals transmitted from individual base stations serving the serving cell and the neighbor cell in the 1.08 MHz bandwidth and determines reception quality RSRQ based on the measured reception level. The measured 1.08 MHz band is typically set such that the center frequency of the measurement band corresponds to the center frequency of the serving cell.

Upon receiving a measurement indication signal from the cell reselection control unit 510, the 5 MHz bandwidth measurement unit 525 measures the radio conditions of the serving cell and the neighbor cell in a 5 MHz bandwidth and supplies the measured radio conditions to the storage unit 540. For example, the 5 MHz bandwidth measurement unit 525 measures reception level of reference signals transmitted from individual base stations serving the serving cell and the neighbor cell in a 5 MHz bandwidth and determines reception quality RSRQ based on the measured reception level. The measured 5 MHz band is typically set such that the center frequency of the measurement band corresponds to the center frequency of the serving cell.

Upon receiving a measurement indication signal from the cell reselection control unit 510, the system bandwidth measurement unit 530 measures the radio conditions of the serving cell and the neighbor cell in a system bandwidth and supplies the measured radio conditions to the storage unit 540. For example, the system bandwidth measurement unit 530 measures reception level of reference signals transmitted from individual base stations serving the serving cell and the neighbor cell in the whole system band and determines reception quality RSRQ based on the measured reception level.

The storage unit 540 stores measurement results of radio quality supplied from the 6RB measurement unit 520, the 5 MHz bandwidth measurement unit 525 and the system bandwidth measurement unit 530 as well as various data for use in cell reselection operations. Also, in response to requests from other components in the mobile apparatus 500, the storage unit 540 supplies the stored data.

The cell reselection determination unit 550 uses the above-stated cell reselection determination criteria to determine whether to perform cell reselection from the serving cell to the neighbor cell based on the radio conditions of the serving cell and the neighbor cell measured by the 6RB measurement unit 520, the 5 MHz bandwidth measurement unit 525 and the system bandwidth measurement unit 530. Upon determining that the cell reselection from the serving cell to the neighbor cell is to be performed, the cell reselection determination unit 550 indicates the cell reselection execution unit 560 to perform the cell reselection.

Upon receiving an indication to initiate the cell reselection from the serving cell to the neighbor cell, the cell reselection execution unit 560 communicates to the base stations serving the serving cell and the neighbor cell and performs the cell reselection to set the neighbor cell as a new serving cell.

Figure 11:
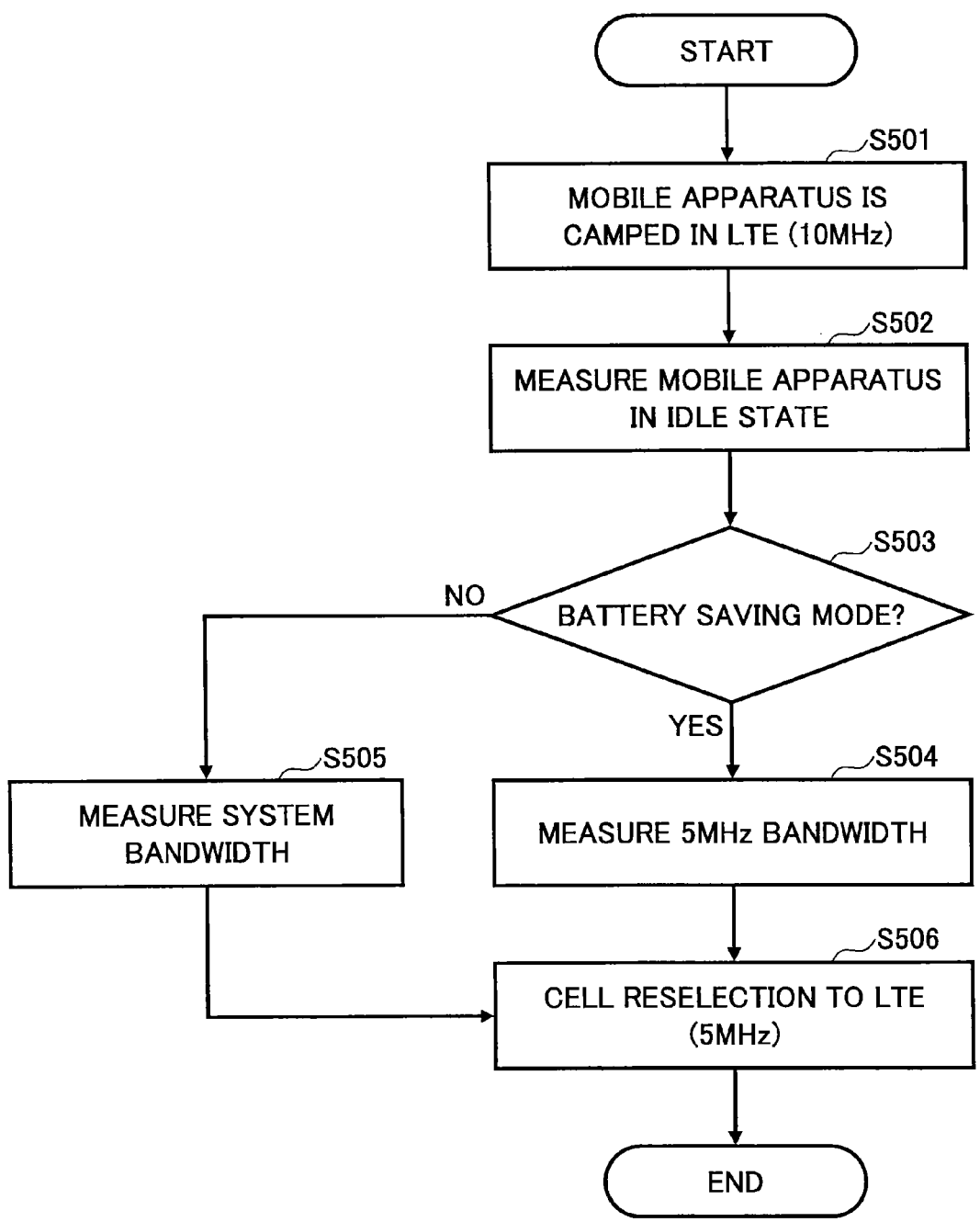
FIG. 11 is a flow diagram for illustrating a cell reselection operation in the mobile apparatus according to the fifth embodiment of the present invention.

FIG. 11 is a flow diagram for illustrating a cell reselection operation in the mobile apparatus according to the fifth embodiment of the present invention. As illustrated in FIG. 11, at step S501, the mobile apparatus 500 is camped in a 10 MHz LTE cell and sets that cell as a serving cell.

At step S502, when the mobile apparatus 500 transitions to the idle state, the cell reselection control unit 510 measures radio conditions of the serving cell and the neighbor cell in accordance with a predefined measurement cycle. As stated above, the cell reselection control unit 510 causes the 6RB measurement unit 520 to measure the radio conditions of the serving cell and the neighbor cell in a 1.08 MHz bandwidth in each measurement occasion, while the cell reselection control unit 510 causes the 5 MHz bandwidth measurement unit 525 or the system bandwidth measurement unit 530 to measure the radio conditions of the serving cell and the neighbor cell in a 5 MHz bandwidth or a system bandwidth in every X measurement occasions. Determination as to which of the 5 MHz bandwidth measurement unit 525 and the system bandwidth measurement unit 530 is to be activated is made depending on a power mode set to the mobile apparatus 500. To this end, the cell reselection control unit 510 inquiries the battery saving mode determination unit 515 whether the mobile apparatus 500 is set to the battery saving mode in every X measurement occasions and activates the 5 MHz bandwidth measurement unit 525 or the system bandwidth measurement unit 530 depending on whether the power mode is set to the battery saving mode.

At step S503, upon receiving a determination indication signal from the cell reselection control unit 510, the battery saving mode determination unit 515 determines whether the mobile apparatus 500 is set to the battery saving mode and indicates the determination result to the cell reselection control unit 510. If the mobile apparatus 500 is set to the battery saving mode (S503: YES), the cell reselection control unit 510 activates the 5 MHz bandwidth measurement unit 525 to reduce power required to measure the radio conditions. On the other hand, if the mobile apparatus 500 is not set to the battery saving mode (S503: NO), the cell reselection control unit 510 activates the system bandwidth measurement unit 530 to measure interference at a higher accuracy.

At step S504, upon receiving a measurement indication signal from the cell reselection control unit 510, the 5 MHz bandwidth measurement unit 525 measures the radio conditions of the serving cell and the neighbor cell in a 5 MHz bandwidth.

At step S505, upon receiving a measurement indication signal from the cell reselection control unit 510, the system bandwidth control unit 530 measures the radio conditions of the serving cell and the neighbor cell in the system bandwidth.

At step S506, the cell reselection determination unit 550 determines whether to initiate cell reselection based on the radio quality of the serving cell and the neighbor cell measured by the 6RB measurement unit 520, the 5 MHz bandwidth measurement unit 525 and the system bandwidth measurement unit 530. Upon determining that the cell reselection from the serving cell to the neighbor cell is to be activated, the cell reselection determination unit 550 indicates the cell reselection execution unit 560 to perform the cell reselection. Upon receiving this cell reselection indication signal, the cell reselection execution unit 560 performs the cell reselection to the indicated neighbor cell.

Next, a mobile apparatus according to the sixth embodiment of the present invention is described with reference to FIGS. 12 and 13. In this embodiment, a mobile apparatus presently communicating to a base station in a 10 MHz LTE cell through an established RRC connection measures radio conditions of a serving cell and a neighbor cell by switching between a measurement band having a bandwidth of six resource blocks (that is, 1.08 MHz) and a wider system bandwidth or a 5 MHz measurement band at a predefined cycle and performs handover to a neighbor cell such as a 5 MHz LTE cell or a 3G cell based on the measured radio conditions. Here, determination as to which of the system bandwidth and the 5 MHz bandwidth is used as the measurement band is made based on whether the mobile apparatus is set to a battery saving mode.

Figure 12:
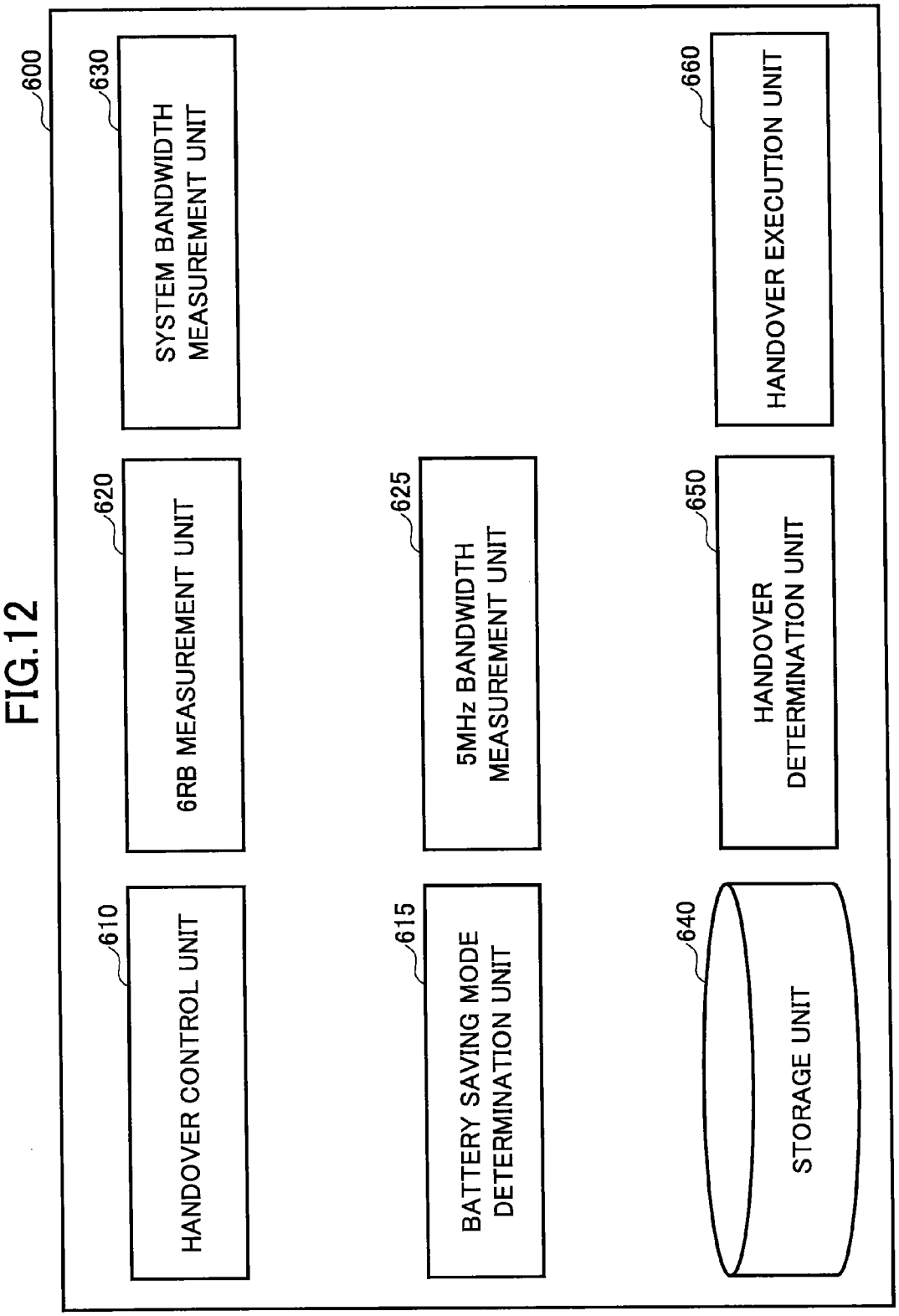
FIG. 12 is a block diagram for illustrating an arrangement of a mobile apparatus according to a sixth embodiment of the present invention.

FIG. 12 is a block diagram for illustrating an arrangement of a mobile apparatus according to the sixth embodiment of the present invention. As illustrated in FIG. 12, a mobile apparatus 600 according to this embodiment includes a handover control unit 610, a battery saving mode determination unit 615, a six resource block (6RB) measurement unit 620, a 5 MHz bandwidth measurement unit 625, a system bandwidth measurement unit 630, a storage unit 640, a cell reselection determination unit 650 and a cell reselection execution unit 660.

The handover control unit 610 controls handover operations in the mobile apparatus 600 presently communicating to a base station through an established RRC connection as a whole. Specifically, the handover control unit 610 indicates the 6RB measurement unit 620 to measure radio conditions of a serving cell and a neighbor cell in a 1.08 MHz bandwidth in accordance with a predefined measurement cycle. In general, mobile apparatuses measure the radio conditions of the presently communicating serving cell and neighbor cells at a predefined measurement cycle.

Furthermore, the handover control unit 610 activates the 5 MHz bandwidth measurement unit 625 or the system bandwidth measurement unit 630 in a portion of measurement occasions specified by a set measurement cycle so as to regularly measure the radio conditions of the serving cell and the neighbor cell in a system bandwidth greater than 1.08 MHz. For example, the handover control unit 610 may activate the 5 MHz bandwidth measurement unit 625 or the system bandwidth measurement unit 630 in every X measurement occasions. The X value for specifying the switch frequency may be a predefined constant or may be dynamically set by the mobile apparatus depending on the radio conditions and/or others. Determination as to which of the 5 MHz bandwidth measurement unit 625 and the system bandwidth measurement unit 630 is to be activated is made based on whether the mobile apparatus 600 is set to a battery saving mode. In general, it is desirable to use measurement results in the system bandwidth in handover determination, but the measurement in the system bandwidth requires much power consumption. On the other hand, even if measurement results in the 5 MHz bandwidth are used, interference can be estimated at an acceptable accuracy. Accordingly, if the mobile apparatus 600 is set to the battery saving mode, the measurement results in the 5 MHz bandwidth are used to determine whether to perform the handover.

Upon receiving a request to determine whether the mobile apparatus 600 is set to the battery saving mode from the handover control unit 610, the battery saving mode determination unit 615 determines whether a power mode of the mobile apparatus 600 is set to the battery saving mode. The power mode of the mobile apparatus 600 may be set by a user or may be dynamically set by the mobile apparatus depending on the radio conditions. If the battery saving mode is set, the battery saving mode determination unit 615 notifies the handover control unit 610 that the mobile apparatus 600 is set to the battery saving mode. Upon receiving this notification, the handover control unit 610 activates the 5 MHz bandwidth measurement unit 625 to measure the radio conditions of the serving cell and the neighbor cell in a 5 MHz bandwidth for reduction in power required to measure the radio conditions. On the other hand, if the battery saving mode is not set, the battery saving mode determination unit 615 notifies the handover control unit 610 that the mobile apparatus 600 is not set to the battery saving mode. Upon receiving this notification, the handover control unit 610 activates the system bandwidth measurement unit 630 to measure the radio conditions of the serving cell and the neighbor cell in the system bandwidth to measure interference with a higher accuracy.

Upon receiving a measurement indication signal from the handover control unit 610, the 6RB measurement unit 620 measures the radio conditions of the serving cell and the neighbor cell in a 1.08 bandwidth corresponding to six resource blocks (RBs) and supplies the measured radio conditions to the storage unit 640. For example, the 6RB measurement unit 620 measures reception level of reference signals transmitted from individual base stations serving the serving cell and the neighbor cell in the 1.08 MHz bandwidth and determines reception quality RSRQ based on the measured reception level. The measured 1.08 MHz band is typically set such that the center frequency of the measurement band corresponds to the center frequency of the serving cell.

Upon receiving a measurement indication signal from the handover control unit 610, the 5 MHz bandwidth measurement unit 625 measures the radio conditions of the serving cell and the neighbor cell in a 5 MHz bandwidth and supplies the measured radio conditions to the storage unit 640. For example, the 5 MHz bandwidth measurement unit 625 measures reception level of reference signals transmitted from individual base stations serving the serving cell and the neighbor cell in a 5 MHz bandwidth and determines reception quality RSRQ based on the measured reception level. The measured 5 MHz band is typically set such that the center frequency of the measurement band corresponds to the center frequency of the serving cell.

Upon receiving a measurement indication signal from the handover control unit 610, the system bandwidth measurement unit 630 measures the radio conditions of the serving cell and the neighbor cell in a system bandwidth and supplies the measured radio conditions to the storage unit 640. For example, the system bandwidth measurement unit 630 measures the reception level of reference signals transmitted from individual base stations serving the serving cell and the neighbor cell in the whole system band and determines the reception quality RSRQ based on the measured reception level.

The storage unit 640 stores measurement results of radio quality supplied from the 6RB measurement unit 620, the 5 MHz bandwidth measurement unit 625 and the system bandwidth measurement unit 630 as well as various data for use in handover operations. Also, in response to requests from other components in the mobile apparatus 600, the storage unit 640 supplies the stored data.

The handover determination unit 650 uses the above-stated handover determination criteria to determine whether handover from the serving cell to the neighbor cell is to be initiated based on the radio conditions of the serving cell and the neighbor cell measured by the 6RB measurement unit 620, the 5 MHz bandwidth measurement unit 625 and the system bandwidth measurement unit 630. Upon determining that the handover from the serving cell to the neighbor cell is to be initiated, the handover determination unit 650 indicates the handover execution unit 660 to initiate the handover.

Upon receiving an indication to perform the handover from the serving cell to the neighbor cell from the handover determination unit 650, the handover execution unit 660 communicates to the base stations serving the serving cell and the neighbor cell and performs the handover to set the neighbor cell as a new serving cell.

Figure 13:
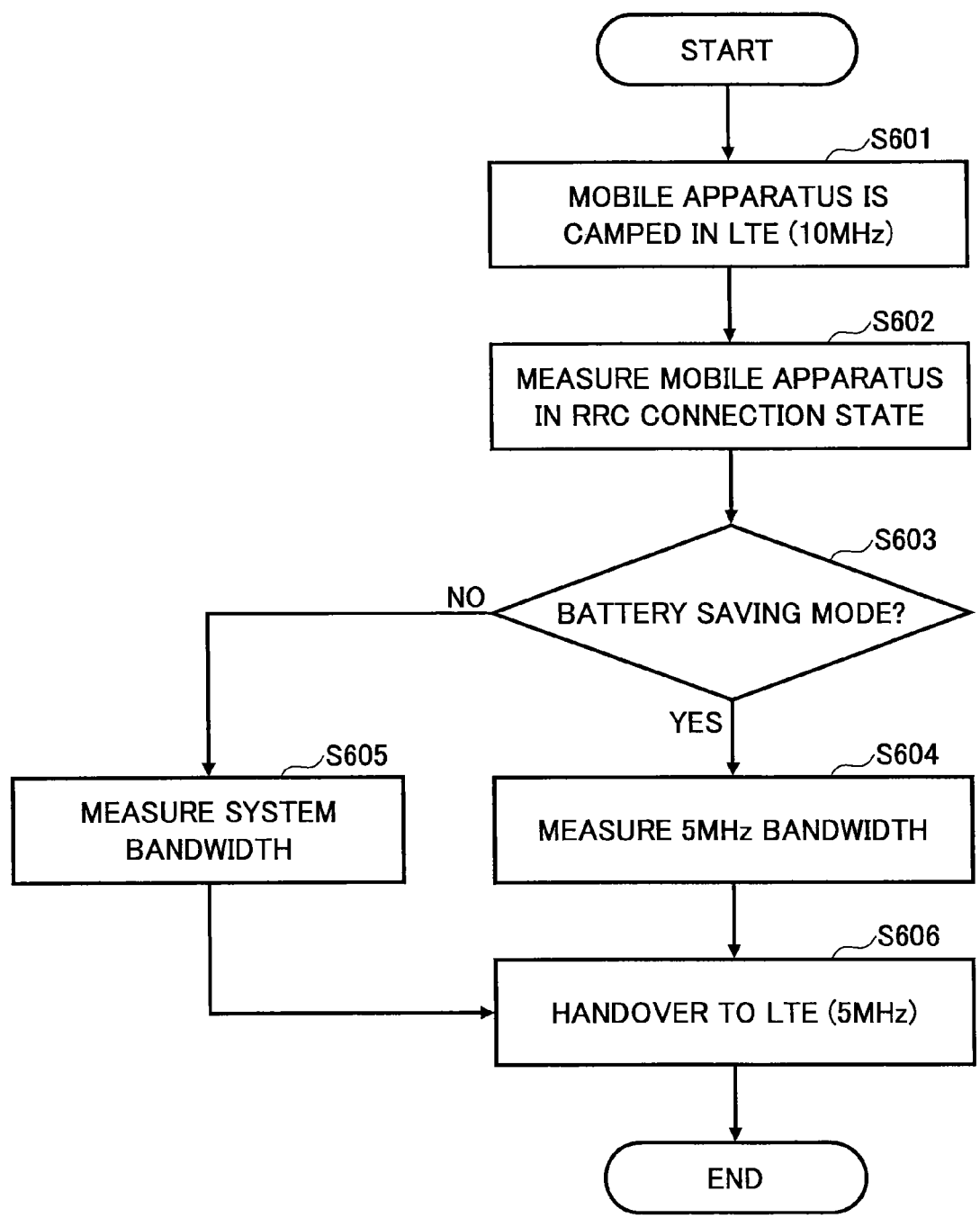
FIG. 13 is a flow diagram for illustrating a handover operation in the mobile apparatus according to the sixth embodiment of the present invention.

FIG. 13 is a flow diagram for illustrating handover operation in the mobile apparatus according to the sixth embodiment of the present invention. As illustrated in FIG. 13, at step S601, the mobile apparatus 600 is camped in a 10 MHz LTE cell and sets that cell as a serving cell.

At step S602, when the mobile apparatus 600 establishes a RRC connection to a base station and transitions to a communication state, the handover control unit 610 measures radio conditions of the serving cell and a neighbor cell being a handover candidate cell in accordance with a predefined measurement cycle. As stated above, the handover control unit 610 causes the 6RB measurement unit 620 to measure the radio conditions of the serving cell and the neighbor cell in a 1.08 bandwidth in each measurement occasion, while the handover control unit 610 causes the 5 MHz bandwidth measurement unit 625 or the system bandwidth measurement unit 630 to measure the radio conditions of the serving cell and the neighbor cell in a 5 MHz bandwidth or a system bandwidth in every X measurement occasions. Determination as to which of the 5 MHz bandwidth measurement unit 625 and the system bandwidth measurement unit 630 is to be activated is made depending on power modes set to the mobile apparatus 600. To this end, the handover control unit 610 inquires from the battery saving mode determination unit 615 whether the mobile apparatus 600 is set to the battery saving mode and activates the 5 MHz bandwidth measurement unit 625 or the system bandwidth measurement unit 630 depending on whether the power mode is set to the battery saving mode.

At step S603, upon receiving a determination indication signal from the handover control unit 610, the battery saving mode determination unit 615 determines whether the mobile apparatus 600 is set to the battery saving mode and indicates the determination result to the handover control unit 610. If the mobile apparatus 600 is set to the battery saving mode (S603: YES), the handover control unit 610 activates the 5 MHz bandwidth measurement unit 625 for reduction in power required to measure the radio conditions. On the other hand, if the mobile apparatus 600 is not set to the battery saving mode (S603: NO), the handover control unit 610 activates the system bandwidth measurement unit 630 to measure interference with a higher accuracy.

At step S604, upon receiving a measurement indication signal from the handover control unit 610, the 5 MHz bandwidth measurement unit 625 measures the radio conditions of the serving cell and the neighbor cell in a 5 MHz bandwidth.

At step S605, upon receiving a measurement indication signal from the handover control unit 610, the system bandwidth measurement unit 630 measures the radio conditions of the serving cell and the neighbor cell in a system bandwidth.

At step S606, the handover determination unit 650 determines whether to perform handover based on the radio quality of the serving cell and the neighbor cell measured by the 6RB measurement unit 620, the 5 MHz bandwidth measurement unit 625 and the system bandwidth measurement unit 630. Upon determining that the handover from the serving cell to the neighbor cell is to be performed, the handover determination unit 650 indicates the handover execution unit 660 to initiate the handover. Upon receiving this handover indication signal, the handover execution unit 660 initiates the handover to the indicated neighbor cell.

Next, a mobile apparatus according to the seventh embodiment of the present invention is described with reference to FIGS. 14 and 15. In this embodiment, a mobile apparatus camped in a 10 MHz LTE cell in an idle state measures radio conditions of a serving cell and a neighbor cell by switching between a measurement band having a bandwidth of six resource blocks (that is, 1.08 MHz) and a wider system bandwidth or a 5 MHz measurement band at a predefined cycle and performs cell reselection to the neighbor cell such as a 5 MHz LTE cell or a 3G cell based on the measured communication state. Here, determination as to which of the system bandwidth or the 5 MHz bandwidth is used as the measurement band is made depending on a battery remaining amount of the mobile apparatus as well as whether a system bandwidth forcing measurement mode is set. If the system bandwidth forcing measurement mode is set, regular measurement in the system bandwidth is forcibly performed regardless of the battery remaining amount.

Figure 14:
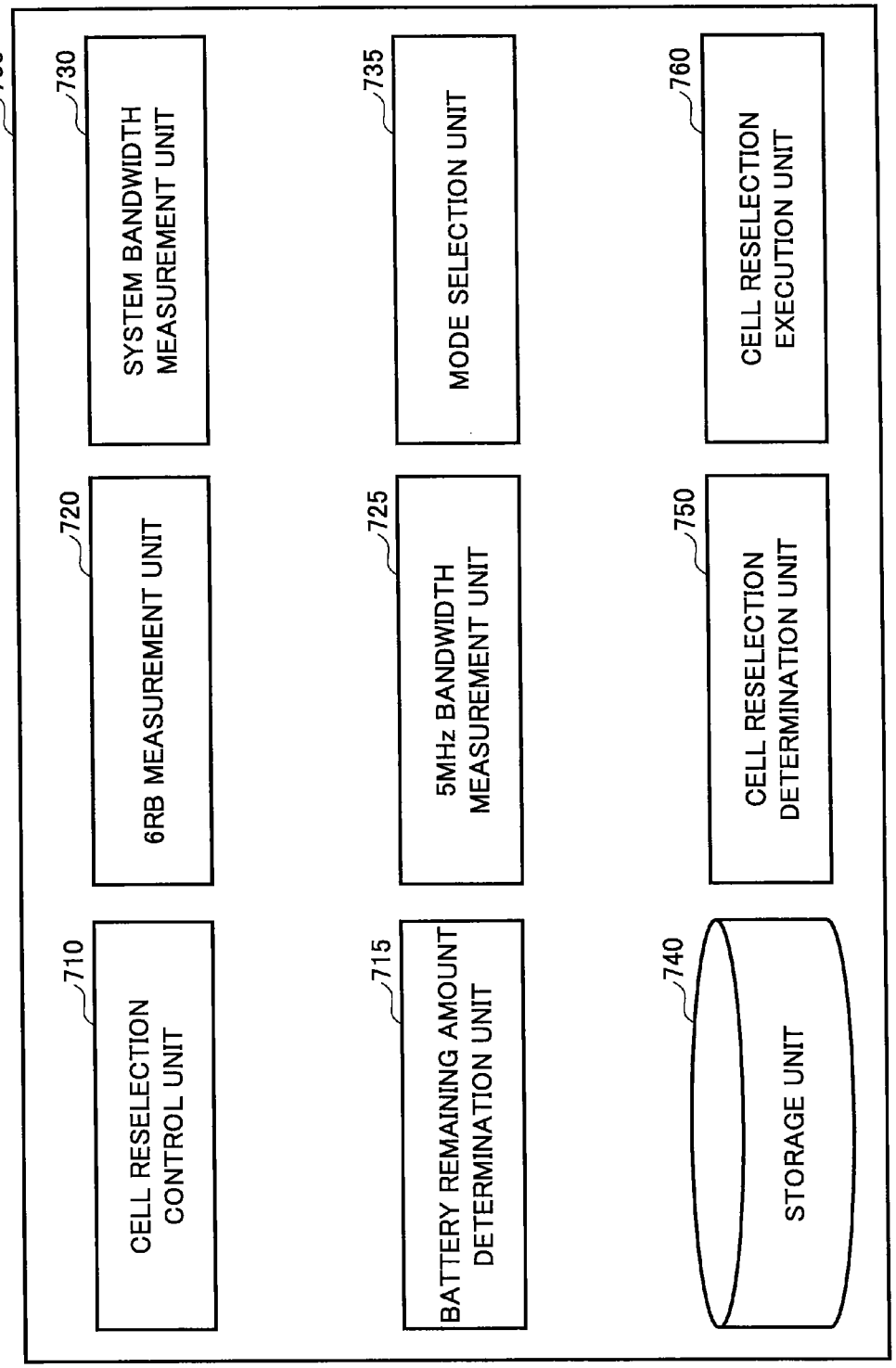
FIG. 14 is a block diagram for illustrating an arrangement of a mobile apparatus according to a seventh embodiment of the present invention.
Figure 15:
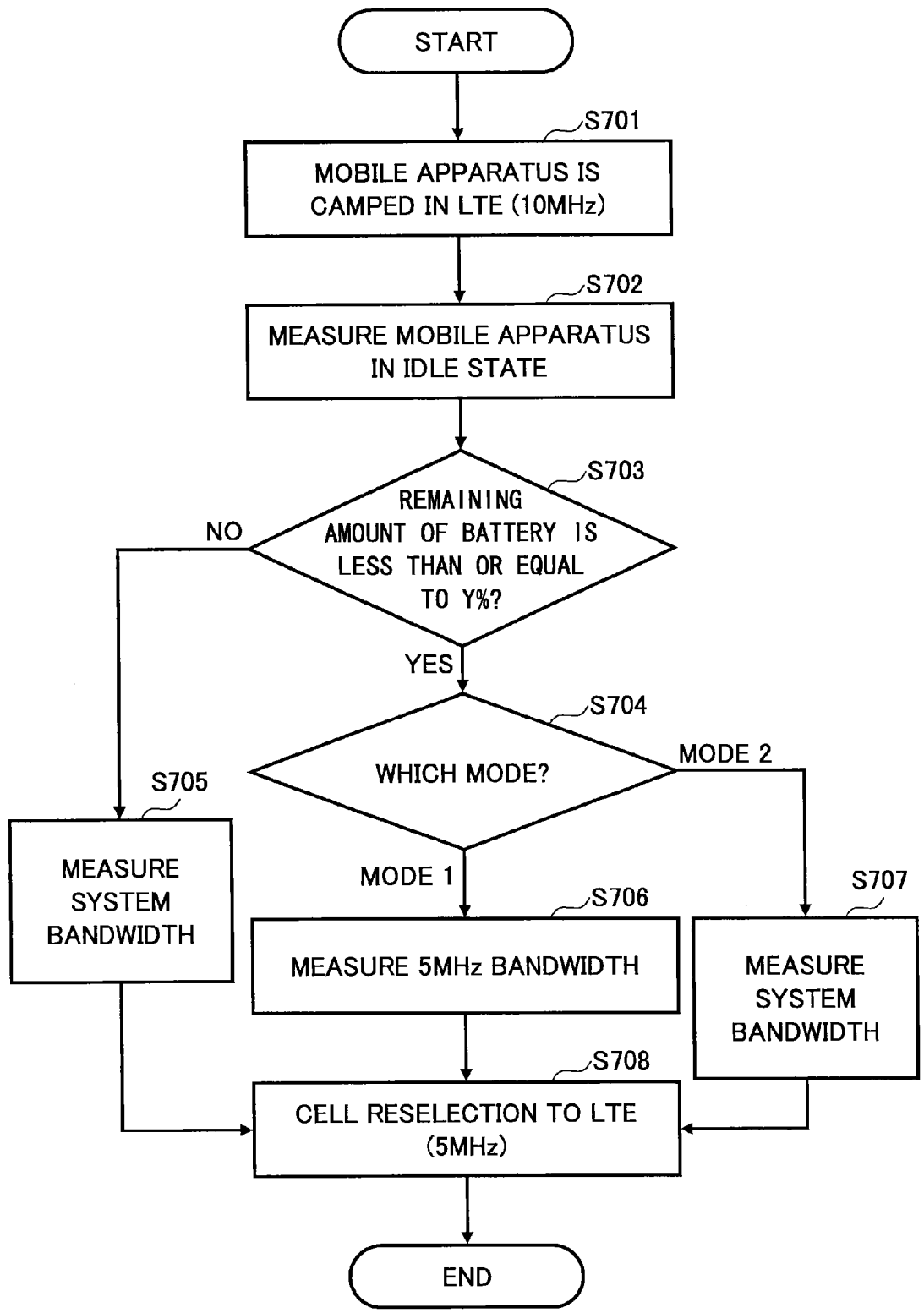
FIG. 15 is a flow diagram for illustrating a cell reselection operation in the mobile apparatus according to the seventh embodiment of the present invention.

FIG. 14 is a block diagram for illustrating an arrangement of a mobile apparatus according to the seventh embodiment of the present invention. As illustrated in FIG. 14, a mobile apparatus 700 according to this embodiment includes a cell reselection control unit 710, a battery remaining amount determination unit 715, a six resource block (6RB) measurement unit 720, a 5 MHz bandwidth measurement unit 725, a system bandwidth measurement unit 730, a mode selection unit 735, a storage unit 740, a cell reselection determination unit 750 and a cell reselection execution unit 760.

The cell reselection control unit 710 controls cell reselection operations in the mobile apparatus 700 in an idle state as a whole. Specifically, the cell reselection control unit 710 indicates the 6RB measurement unit 720 to measure radio conditions of a serving cell and a neighbor cell in a 1.08 bandwidth in accordance with a predefined measurement cycle. In general, a DRX function can be applied to mobile apparatuses in the idle state for reduction in power consumption. Accordingly, if the DRX function is applied to the mobile apparatus 700 in the idle state, the cell reselection control unit 710 may set the measurement cycle depending on the DRX cycle length.

Furthermore, the cell reselection control unit 710 activates the 5 MHz bandwidth measurement unit 725 or the system bandwidth measurement unit 730 in a portion of measurement occasions specified by a set measurement cycle so as to regularly measure the radio conditions of the serving cell and the neighbor cell in a bandwidth greater than 1.08 MHz. For example, the cell reselection control unit 710 may activate the 5 MHz bandwidth measurement unit 725 or the system bandwidth measurement unit 730 in every X measurement occasions. The X value for specifying the switch frequency may be a predefined constant or may be dynamically set by the mobile apparatus depending on the radio conditions and/or others. Determination as to which of the 5 MHz bandwidth measurement unit 725 and the system bandwidth measurement unit 730 is to be activated is made based on the battery remaining amount of the mobile apparatus 700 as well as whether the system bandwidth forcing measurement mode is set. In general, it is desirable to use measurement results in a system bandwidth in cell reselection determination, but the measurement in the system bandwidth requires much power consumption. On the other hand, even if measurement results in a 5 MHz bandwidth are used, interference can be estimated with an acceptable accuracy. Accordingly, when the battery remaining amount of the mobile apparatus 700 is small, the measurement results in the 5 MHz bandwidth are used to determine the cell reselection. However, even if the battery remaining amount of the mobile apparatus 700 is small, the mobile apparatus 700 may be set to forcibly measure the system bandwidth in a portion of wider band measurement occasions in the 5 MHz bandwidth to improve interference estimation accuracy (system bandwidth forcing measurement mode). For example, the cell reselection control unit 710 may activate the system bandwidth measurement unit 730 in every X' measurement occasions by the 5 MHz bandwidth measurement unit 725. In this case, the radio conditions of the serving cell and the neighbor cell would be forcibly measured in the system bandwidth in every XX' measurement occasions specified by a set measurement cycle. Here, the X' value for specifying the switch frequency may be a predefined constant or may be dynamically set by the mobile apparatus depending on the radio conditions and/or others. For example, if X'=2, the 5 MHz bandwidth measurement unit 725 and the system bandwidth measurement unit 730 are alternately activated in one wider band measurement occasion of X measurement occasions. Accordingly, if the battery remaining amount is not sufficient, it is possible to improve the interference estimation accuracy while reducing power consumption required to measure the radio conditions.

Upon receiving a request to determine the battery remaining amount from the cell reselection control unit 710, the battery remaining amount determination unit 715 detects the battery remaining amount of the mobile apparatus 700 and determines whether the detected battery remaining amount is less than or equal to a predefined threshold Y %. The Y value may be a predefined constant or may be dynamically set by the mobile apparatus depending on the radio conditions and/or others. If the detected battery remaining amount is greater than Y %, the battery remaining amount determination unit 715 notifies the cell reselection control unit 710 that the detected battery remaining amount is greater than Y %. Upon receiving this notification, the cell reselection control unit 710 determines that the battery remaining amount is sufficient to measure the system bandwidth and activates the system bandwidth measurement unit 730 to measure the radio conditions of the serving cell and the neighbor cell. On the other hand, if the detected battery remaining amount is less than or equal to Y %, the battery remaining amount determination unit 715 notifies the cell reselection control unit 710 that the detected battery remaining amount is less than or equal to Y %. Upon receiving this notification, the cell reselection control unit 710 determines that the battery remaining amount is not sufficient to measure the system bandwidth and inquires from the mode selection unit 735 whether the system bandwidth forcing measurement mode is set to the mobile apparatus 700.

Upon receiving a measurement mode determination signal from the cell reselection control unit 710, the mode selection unit 735 determines whether the system bandwidth forcing measurement mode is set to the mobile apparatus 700 and indicates the determination result to the cell reselection control unit 710. Upon receiving an indication from the mode selection unit 735 that the system bandwidth forcing measurement mode is set, the cell reselection control unit 710 activates the 5 MHz bandwidth measurement unit 725 in (X'−1) times of X' wider band measurement occasions and the system bandwidth measurement unit 730 in one of the X' wider band measurement occasions. On the other hand, upon receiving a notification from the mode selection unit 735 that the system bandwidth forcing measurement mod is not set, the cell reselection control unit 710 activates the 5 MHz bandwidth measurement unit 725 in all the wider band measurement occasions.

Upon receiving a measurement indication signal from the cell reselection control unit 710, the 6RB measurement unit 720 measures the radio conditions of the serving cell and the neighbor cell in a 1.08 MHz bandwidth corresponding to six resource blocks (RBs) and supplies the measured radio conditions to the storage unit 740. For example, the 6RB measurement unit 720 measures the reception level of reference signals transmitted from individual base stations serving the serving cell and the neighbor cell in a 1.08 bandwidth and determines reception quality RSRQ based on the measured reception level. The measured 1.08 MHz band is typically set such that the center frequency of the measurement band corresponds to the center frequency of the serving cell.

Upon receiving a measurement indication signal from the cell reselection control unit 710, the 5 MHz bandwidth measurement unit 725 measures the radio conditions of the serving cell and the neighbor cell in a 5 MHz bandwidth and supplies the measured radio conditions to the storage unit 740. For example, the 5 MHz bandwidth measurement unit 725 measures reception level of reference signals transmitted from individual base stations of the serving cell and the neighbor cell in a 5 MHz bandwidth and determines reception quality RSRQ based on the measured reception level. The measured 5 MHz band is typically set such that the center frequency of the measurement band corresponds to the center frequency of the serving cell.

Upon receiving a measurement indication signal from the cell reselection control unit 710, the system bandwidth measurement unit 730 measures the radio conditions of the serving cell and the neighbor cell in the system bandwidth and supplies the measured radio conditions to the storage unit 740. For example, the system bandwidth measurement unit 730 measures reception level of reference signals transmitted from individual base stations of the serving cell and the neighbor cell in the whole system bandwidth and determines reception quality RSRQ based on the measured reception level.

The storage unit 740 stores measurement results of radio quality supplied from the 6RB measurement unit 720, the 5 MHz bandwidth measurement unit 725 and the system bandwidth measurement unit 730 as well as various data for use in cell reselection operations. Also, in response to requests from other components in the mobile apparatus 700, the storage unit 740 supplies the stored data.

The cell reselection determination unit 750 uses the above-stated cell reselection determination criteria to determine whether to perform cell reselection from a serving cell to a neighbor cell based on radio conditions of the serving cell and the neighbor cell measured by the 6RB measurement unit 720, the 5 MHz bandwidth measurement unit 725 and the system bandwidth measurement unit 730. Upon determining that the cell reselection from the serving cell to the neighbor cell is to be performed, the cell reselection determination unit 750 indicates the cell reselection execution unit 760 to initiate the cell reselection.

Upon receiving an indication to initiate the cell reselection from the serving cell to the neighbor cell from the cell reselection determination unit 750, the cell reselection execution unit 760 communicates to base stations of the serving cell and the neighbor cell and performs the cell reselection to set the neighbor cell to a new serving cell.

FIG. 14 is a flow diagram for illustrating a cell reselection operation in a mobile apparatus according to the seventh embodiment of the present invention. As illustrated in FIG. 14, at step S701, the mobile apparatus 700 is camped in a 10 MHz LTE cell and sets that cell to a serving cell.

At step S702, when the mobile apparatus 700 transitions to the idle state, the cell reselection control unit 710 measures radio conditions of the serving cell and a neighbor cell in accordance with a predefined measurement cycle. As stated above, the cell reselection control unit 710 causes the 6 RB measurement unit 720 to measure the radio conditions of the serving cell and the neighbor cell in a 1.08 bandwidth in each measurement occasion, while the cell reselection control unit 710 causes the 5 MHz bandwidth measurement unit 725 or the system bandwidth measurement unit 730 to measure the radio conditions of the serving cell and the neighbor cell in a 5 MHz bandwidth or a system bandwidth in every X measurement occasions. Determination as to which of the 5 MHz bandwidth measurement unit 725 and the system bandwidth measurement unit 730 is to be activated is made based on the battery remaining amount of the mobile apparatus 700 as well as whether the system bandwidth forcing measurement mode is set to the mobile apparatus 700. To this end, the cell reselection control unit 710 inquires from the battery remaining amount determination unit 715 whether the battery remaining amount is sufficient in every X measurement occasions.

At step S703, upon receiving a determination indication signal from the cell reselection control unit 710, the battery remaining amount determination unit 715 detects the battery remaining amount of the mobile apparatus 700, determines whether the detected battery remaining amount is less than or equal to a predefined threshold Y % and indicates the determination result to the cell reselection control unit 710. If the detected battery remaining amount is less than or equal to Y % (S703: YES), the cell reselection control unit 710 further inquires from the mode selection unit 735 whether the system bandwidth forcing measurement mode is set. On the other hand, if the detected battery remaining amount is greater than Y % (S703: NO), the cell reselection control unit 710 determines that the battery remaining amount of the mobile apparatus 700 is sufficient and activates the system bandwidth measurement unit 730.

At step S704, upon receiving a measurement mode determination signal from the cell reselection control unit 710, the mode selection unit 735 determines whether the system bandwidth forcing measurement mode is set to the mobile apparatus 700 and indicates the determination result to the cell reselection control unit 710. If the system bandwidth forcing measurement mode is not set (S704: Mode 1), the cell reselection control unit 710 activates the 5 MHz bandwidth measurement unit 725 in all wider band measurement occasions. On the other hand, if the system bandwidth forcing measurement mode is set (S704: Mode 2), the cell reselection control unit 710 activates the system bandwidth measurement unit 730 every X' wider band measurement occasions.

At step S705, upon receiving a measurement indication signal from the cell reselection control unit 710, the system bandwidth measurement unit 730 measures the radio conditions of the serving cell and the neighbor cell in the system bandwidth.

At step S706, upon receiving a measurement indication signal from the cell reselection control unit 710, the 5 MHz bandwidth measurement unit 725 measures the radio conditions of the serving cell and the neighbor cell in a 5 MHz bandwidth.

At step S707, upon receiving a measurement indication signal from the cell reselection control unit 710, the system bandwidth measurement unit 730 measures the radio conditions of the serving cell and the neighbor cell in the system bandwidth.

At step S708, the cell reselection determination unit 750 determines whether to perform cell reselection based on radio quality of the serving cell and the neighbor cell measured by the 6RB measurement unit 720, the 5 MHz bandwidth measurement unit 725 and the system bandwidth measurement unit 730. Upon determining that cell reselection from the serving cell to the neighbor cell is to be performed, the cell reselection determination unit 750 indicates the cell reselection execution unit 760 to initiate the cell reselection. Upon receiving this cell reselection indication signal, the cell reselection execution unit 760 performs the cell reselection to the indicated neighbor cell.

Next, a mobile apparatus according to the eighth embodiment of the present invention is described with reference to FIGS. 16 and 17. In this embodiment, a mobile apparatus presently communicating to a base station in a 10 MHz LTE cell through an established RRC connection measures radio conditions of a serving cell and a neighbor cell by switching between a measurement band having a bandwidth of six resource blocks (that is, 1.08 MHz) and a wider system bandwidth or a 5 MHz measurement band at a predefined cycle and performs handover to the neighbor cell such as a 5 MHz LTE cell or a 3G cell based on the measured radio conditions. Here, determination as to which of the system bandwidth and the 5 MHz bandwidth is used as the measurement band is made based on the battery remaining amount of the mobile apparatus as well as whether the system bandwidth forcing measurement mode is set. If the system bandwidth forcing measurement mode is set, regular measurement is forcibly performed in the system bandwidth regardless of the battery remaining amount.

Figure 16:
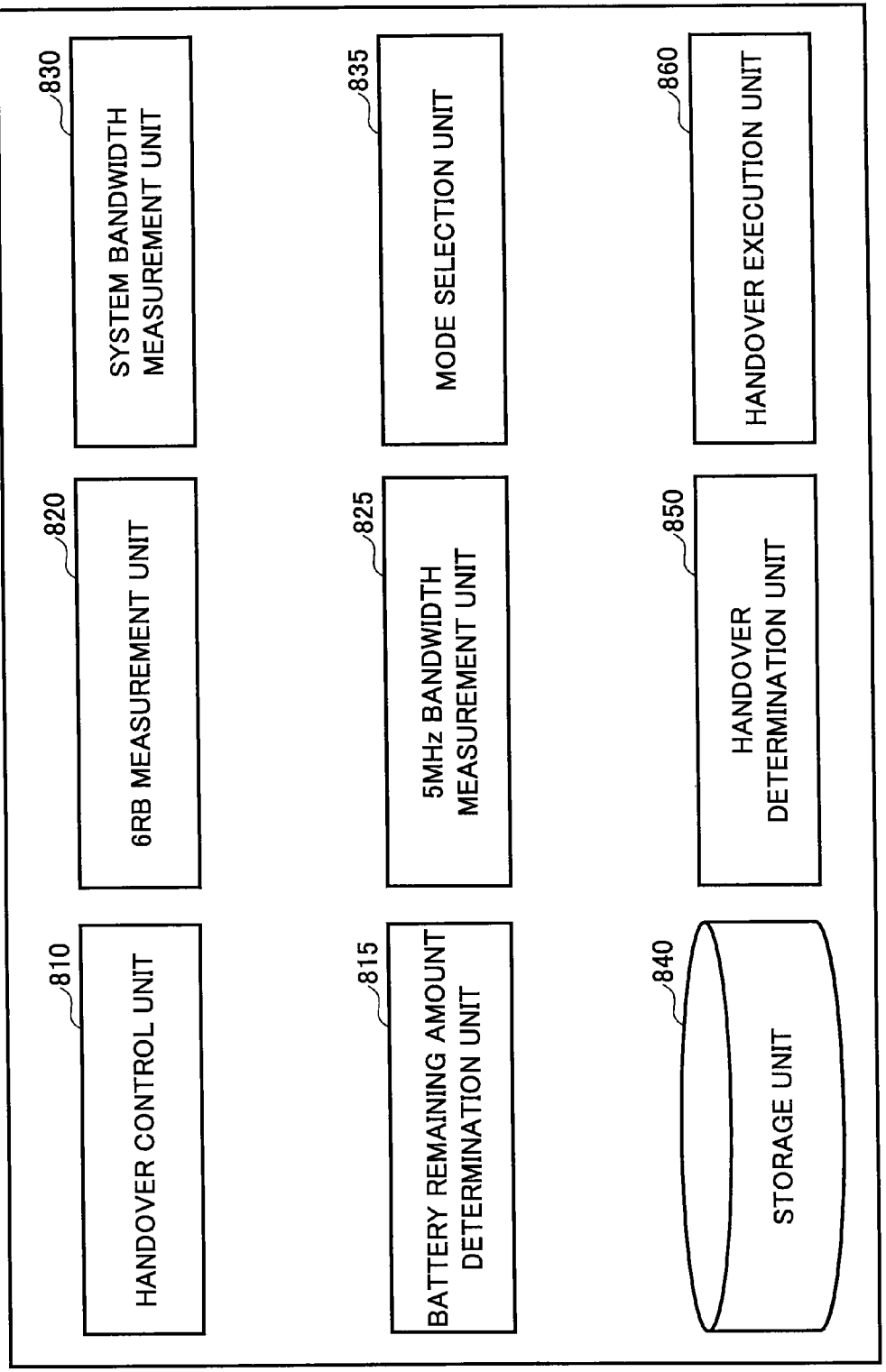
FIG. 16 is a block diagram for illustrating an arrangement of a mobile apparatus according to an eight embodiment of the present invention.

FIG. 16 is a block diagram for illustrating an arrangement of a mobile apparatus according to the eighth embodiment of the present invention. As illustrated in FIG. 16, a mobile apparatus 800 according to this embodiment includes a handover control unit 810, a battery remaining amount determination unit 815, a six resource block (6RB) measurement unit 820, a 5 MHz bandwidth measurement unit 825, a system bandwidth measurement unit 830, a mode selection unit 835, a storage unit 840, a handover determination unit 850 and a handover execution unit 860.

The handover control unit 810 controls handover operations in the mobile apparatus 800 presently communicating to a base station through an established RRC connection as a whole. Specifically, the handover control unit 810 indicates the 6RB measurement unit 820 to measure radio conditions of a serving cell and a neighbor cell in a 1.08 MHz bandwidth in accordance with a predefined measurement cycle. In general, mobile apparatuses measure radio conditions of a presently communicating serving cell and neighbor cells at a predefined measurement cycle.

Furthermore, the handover control unit 810 activates the 5 MHz bandwidth measurement unit 825 or the system bandwidth measurement unit 830 in a portion of measurement occasions specified by a set measurement cycle so as to regularly measure the radio conditions of the serving cell and the neighbor cell in a bandwidth greater than 1.08 MHz. For example, the handover control unit 810 may activate the 5 MHz bandwidth measurement unit 825 or the system bandwidth measurement unit 830 in every X measurement occasions. The X value for specifying the switch frequency may be a predefined constant or may be dynamically set by the mobile apparatus depending on the radio conditions and/or others. Determination as to which of the 5 MHz bandwidth measurement unit 825 and the system bandwidth measurement unit 830 is to be activated is made based on the battery remaining amount of the mobile apparatus 800 as well as whether the system bandwidth forcing measurement mode is set. In general, it is desirable to use measurement results in the system bandwidth in handover determination, but the measurement in the system bandwidth requires much power consumption. On the other hand, even if measurement results in the 5 MHz bandwidth are used, interference can be estimated at an acceptable accuracy. Accordingly, if the battery remaining amount of the mobile apparatus 800 is small, the measurement results in the 5 MHz bandwidth are used to determine whether to perform the handover. However, even if the battery remaining amount of the mobile apparatus 800 is small, the mobile apparatus 800 may be set to forcibly measure the system bandwidth in a portion of wider band measurement occasions in the 5 MHz bandwidth to improve interference estimation accuracy (system bandwidth forcing measurement mode). For example, the handover control unit 810 may activate the system bandwidth measurement unit 830 in every X' wider band measurement occasions by the 5 MHz bandwidth measurement unit 825. In this case, the radio conditions of the serving cell and the neighbor cell in the system bandwidth would be forcibly measured in every XX' measurement occasions specified by a set measurement cycle. Here, the X' value for specifying the switch frequency may be a predefined constant or may be dynamically set by the mobile apparatus depending on the radio conditions and/or others. For example, if X'=2, the 5 MHz bandwidth measurement unit 825 and the system bandwidth measurement unit 830 are alternately activated in one wider band measurement occasion of X measurement occasions. Accordingly, if the battery remaining amount is not sufficient, it is possible to improve the interference estimation accuracy while reducing power consumption required to measure the radio conditions.

Upon receiving a request to determine the battery remaining amount from the handover control unit 810, the battery remaining amount determination unit 815 detects the battery remaining amount of the mobile apparatus 800 and determines whether the detected battery remaining amount is less than or equal to a predefined threshold Y %. The Y value may be a predefined constant or may be dynamically set by the mobile apparatus depending on the radio conditions and/or others. If the detected battery remaining amount is greater than Y %, the battery remaining amount determination unit 815 notifies the handover control unit 810 that the detected battery remaining amount is greater than Y %. Upon receiving this notification, the handover control unit 810 determines that the battery remaining amount is sufficient to measure the system bandwidth and activates the system bandwidth measurement unit 830 to measure the radio conditions of the serving cell and the neighbor cell in the system bandwidth. On the other hand, if the detected battery remaining amount is less than or equal to Y %, the battery remaining amount determination unit 815 notifies the handover control unit 810 that the detected battery remaining amount is less than or equal to Y %. Upon receiving this notification, the handover control unit 810 determines that the battery remaining amount is not sufficient to measure the system bandwidth and inquires from the mode selection unit 835 whether the system bandwidth forcing measurement mode is set to the mobile apparatus 800.

Upon receiving a measurement mode determination signal from the handover control unit 810, the mode selection unit 835 determines whether the system bandwidth forcing measurement mode is set to the mobile apparatus 800 and indicates the determination result to the handover control unit 810. Upon receiving an indication from the mode selection unit 835 that the system bandwidth forcing measurement mode is set, the handover control unit 810 activates the 5 MHz bandwidth measurement unit 825 in (X'−1) times of X' wider band measurement occasions and the system bandwidth measurement unit 830 in one of the X' wider band measurement occasions. On the other hand, upon receiving an indication from the mode selection unit 835 that the system bandwidth forcing measurement mode is not set, the handover control unit 810 activates the 5 MHz bandwidth measurement unit 825 in all the wider band measurement occasions.

Upon receiving a measurement indication signal from the handover control unit 810, the 6RB measurement unit 820 measures the radio conditions of the serving cell and the neighbor cell in a 1.08 MHz bandwidth corresponding to six resource blocks (RBs) and supplies the measured radio conditions to the storage unit 840. For example, the 6RB measurement unit 820 measures the reception level of reference signals transmitted from individual base stations serving the serving cell and the neighbor cell in the 1.08 MHz bandwidth and determines reception quality RSRQ based on the measured reception level. The measured 1.08 MHz band is typically set such that the center frequency of the measurement band corresponds to the center frequency of the serving cell.

Upon receiving a measurement indication signal from the handover control unit 810, the 5 MHz bandwidth measurement unit 825 measures the radio conditions of the serving cell and the neighbor cell in a 5 MHz bandwidth and supplies the measured radio conditions to the storage unit 840. For example, the 5 MHz bandwidth measurement unit 825 measures the reception level of reference signals transmitted from individual base stations serving the serving cell and the neighbor cell in the 5 MHz bandwidth and determines reception quality RSRQ based on the measured reception level. The measured 5 MHz band is typically set such that the center frequency of the measurement band corresponds to the center frequency of the serving cell.

Upon receiving a measurement indication signal from the handover control unit 810, the system bandwidth measurement unit 830 measures the radio conditions of the serving cell and the neighbor cell in a system bandwidth and supplies the measured radio conditions to the storage unit 840. For example, the system bandwidth measurement unit 830 measures the reception level of reference signals transmitted from individual base stations serving the serving cell and the neighbor cell in the whole system band and determines reception quality RSRQ based on the measured reception level.

The storage unit 840 stores measurement results of radio quality supplied from the 6RB measurement unit 820, the 5 MHz bandwidth measurement unit 825 and the system bandwidth measurement unit 830 as well as various data for use in handover operations. Also, in response to requests from other components in the mobile apparatus 800, the storage unit 840 supplies the stored data.

The handover determination unit 850 uses the above-stated handover determination criteria to determine whether to perform handover from the serving cell to the neighbor cell based on the radio conditions of the serving cell and the neighbor cell measured by the 6RB measurement unit 820, the 5 MHz bandwidth measurement unit 825 and the system bandwidth measurement unit 830. Upon determining that the handover from the serving cell to the neighbor cell is to be performed, the handover determination unit 850 indicates the handover execution unit 860 to initiate the handover.

Upon receiving an indication to initiate the handover from the serving cell to the neighbor cell from the handover determination unit 850, the handover execution unit 860 communicates to the base stations serving the serving cell and the neighbor cell and initiates the handover to set the neighbor cell as a new serving cell.

Figure 17:
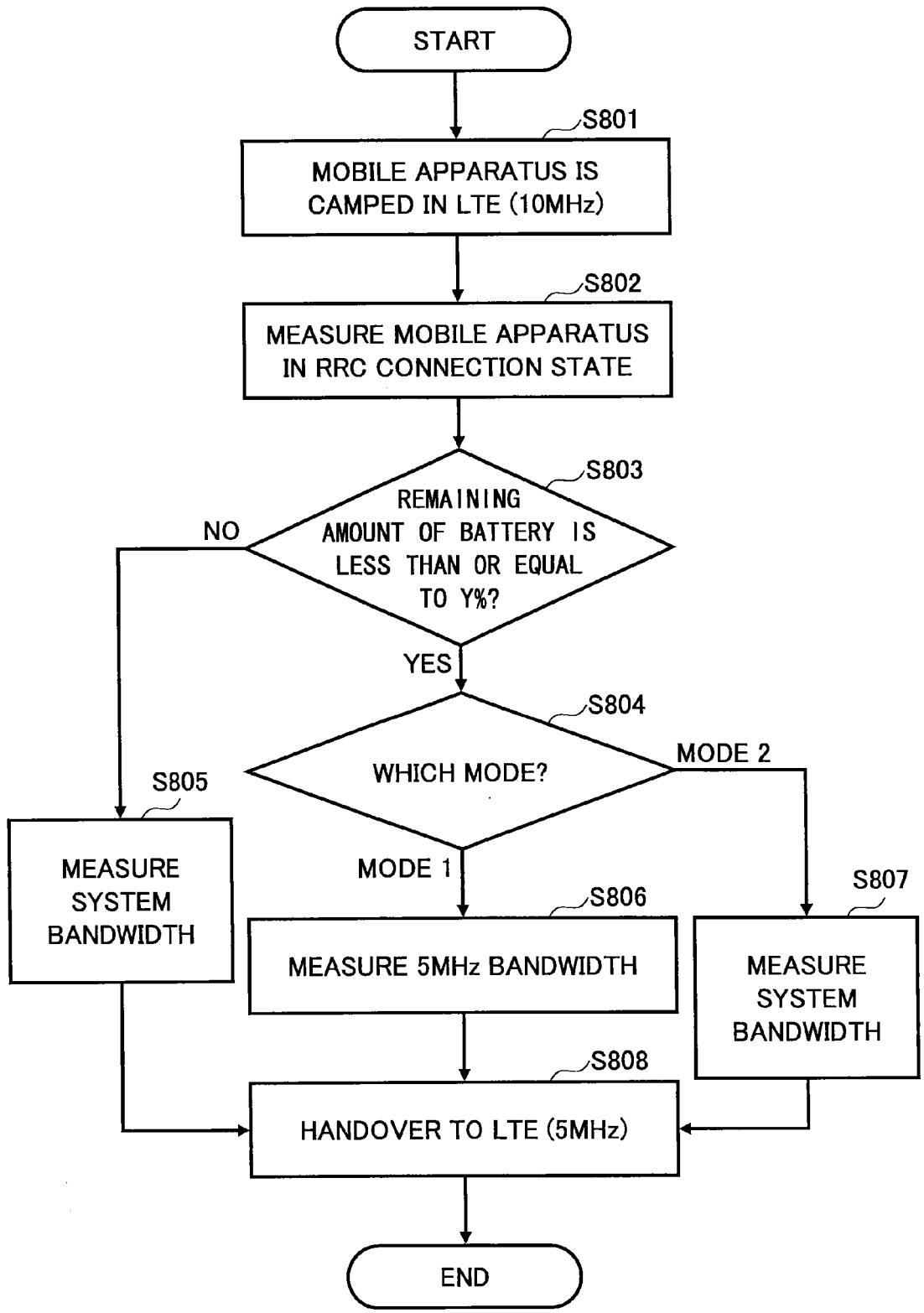
FIG. 17 is a flow diagram for illustrating a handover operation in the mobile apparatus according to the eighth embodiment of the present invention.

FIG. 17 is a flow diagram for illustrating a handover operation in the mobile apparatus according to the eighth embodiment of the present invention. As illustrated in FIG. 17, at step S801, the mobile apparatus 800 is camped in a 10 MHz LTE cell and sets that cell as a serving cell.

At step S802, when the mobile apparatus 800 establishes a RRC connection to a base station and transitions to a communication state, the handover control unit 810 measures radio conditions of the serving cell and a neighbor cell being a handover candidate cell in accordance with a predefined measurement cycle. As stated above, the handover control unit 810 causes the 6RB measurement unit 820 to measure the radio conditions of the serving cell and the neighbor cell in a 1.08 MHz bandwidth in each measurement occasion, while the handover control unit 810 causes the 5 MHz bandwidth measurement unit 825 or the system bandwidth measurement unit 830 to measure the radio conditions of the serving cell and the neighbor cell in a 5 MHz bandwidth or a system bandwidth in every X measurement occasions. Determination as to which of the 5 MHz bandwidth measurement unit 825 and the system bandwidth measurement unit 830 is to be activated is made based on the battery remaining amount of the mobile apparatus 800 as well as whether the system bandwidth forcing measurement mode is set to the mobile apparatus 800. To this end, the handover control unit 810 inquires from the battery remaining amount determination unit 815 whether the battery remaining amount is sufficient in every X measurement occasions.

At step S803, upon receiving a determination indication signal from the handover control unit 810, the battery remaining amount determination unit 815 detects the battery remaining amount of the mobile apparatus 800, determines whether the detected battery remaining amount is less than or equal to a predefined threshold Y % and indicates the determination result to the handover control unit 810. If the detected battery remaining amount is less than Y % (S803: YES), the handover control unit 810 further inquires from the mode selection unit 835 whether the system bandwidth forcing measurement mode is set. On the other hand, if the detected battery remaining amount is greater than Y % (S803: NO), the handover control unit 810 determines that the battery remaining amount of the mobile apparatus 800 is sufficient and activates the system bandwidth measurement unit 830.

At step S804, upon receiving a measurement mode determination signal from the cell reselection control unit 810, the mode selection unit 835 determines whether the system bandwidth forcing measurement mode is set to the mobile apparatus 800 and indicates the determination result to the handover control unit 810. If the system bandwidth forcing measurement mode is not set (S804: Mode 1), the handover control unit 810 activates the 5 MHz measurement unit 825 in all wider band measurement occasions. On the other hand, if the system bandwidth forcing measurement mode is set (S804: Mode 2), the handover control unit 810 activates the system bandwidth measurement unit 830 in every X' wider band measurement occasions.

At step S805, upon receiving a measurement indication signal from the handover control unit 810, the system bandwidth measurement unit 830 measures the radio conditions of the serving cell and the neighbor cell in the system bandwidth.

At step S806, upon receiving a measurement indication signal from the handover control unit 810, the 5 MHz bandwidth measurement unit 825 measures the radio conditions of the serving cell and the neighbor cell in the 5 MHz bandwidth.

At step S807, upon receiving a measurement indication signal from the handover control unit 810, the system bandwidth measurement unit 830 measures the radio conditions of the serving cell and the neighbor cell in the system bandwidth.

At step S808, the handover determination unit 850 determines whether to perform handover based on radio quality of the serving cell and the neighbor cell measured by the 6RB measurement unit 820, the 5 MHz bandwidth measurement unit 825 and the system bandwidth measurement unit 830. Upon determining that the handover from the serving cell to the neighbor cell is to be performed, the handover determination unit 850 indicates the handover execution unit 860 to initiate the handover. Upon receiving this handover indication signal, the handover execution unit 860 performs the handover to the indicated neighbor cell.

Next, a mobile apparatus according to the ninth embodiment of the present invention is described with reference to FIGS. 18 and 19. In this embodiment, a mobile apparatus camped in a 10 MHz LTE cell in an idle state measures radio conditions of a serving cell and a neighbor cell by switching between a measurement band having a bandwidth of six resource blocks (that is, 1.08 MHz) and a wider system bandwidth or a 5 MHz measurement band at a predefined cycle and performs cell reselection to a neighbor cell such as a 5 MHz LTE cell or a 3G cell based on the measured radio conditions. Here, determination as to which of the system bandwidth and the 5 MHz bandwidth is used as the measurement band is made based on whether the battery saving mode is set as well as whether the system bandwidth forcing measurement mode is set. If the system bandwidth forcing measurement mode is set, regular measurement in the system bandwidth is forcibly performed regardless of setting of the battery saving mode.

Figure 18:
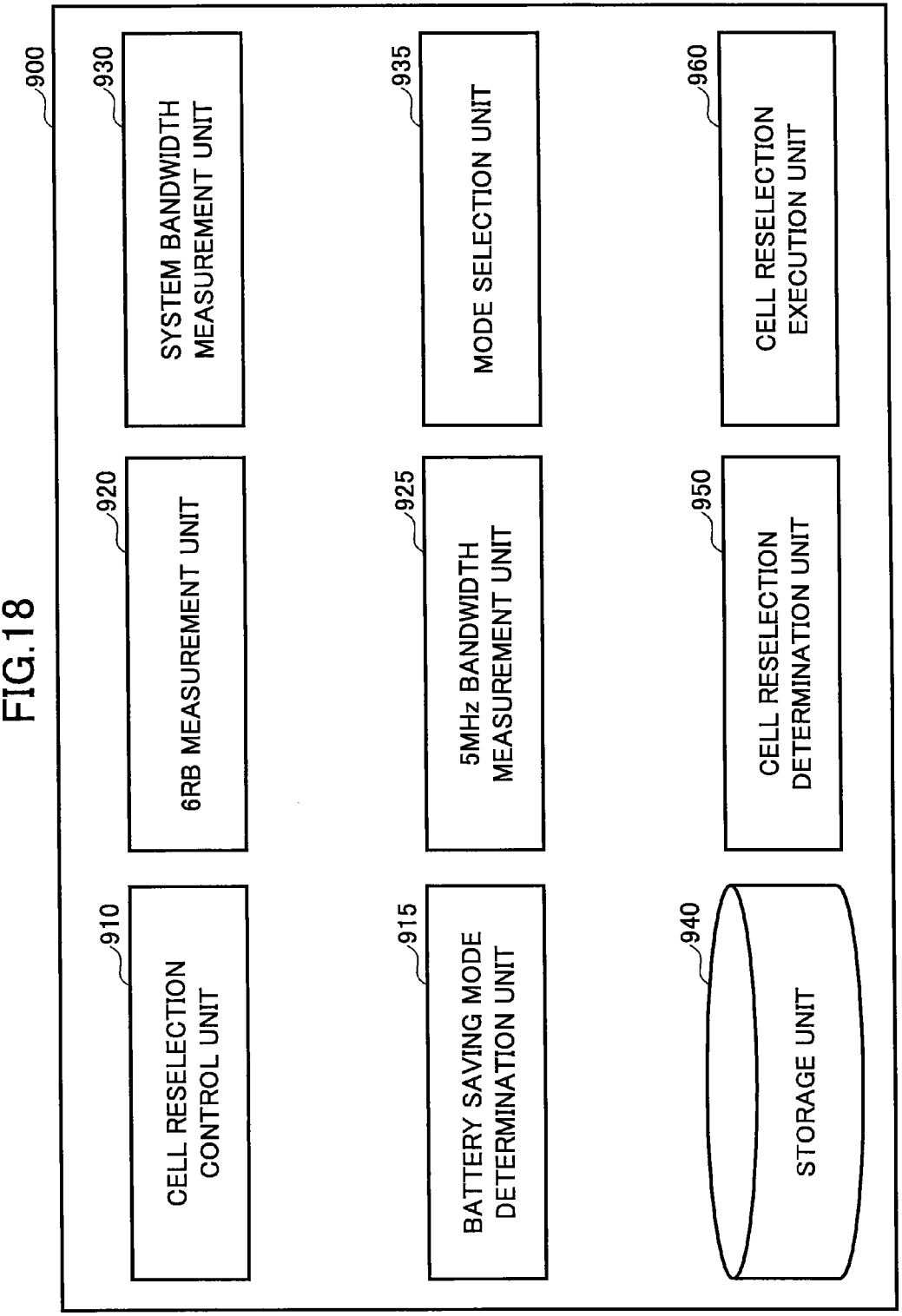
FIG. 18 is a block diagram for illustrating an arrangement of a mobile apparatus according to a ninth embodiment of the present invention.

FIG. 18 is a block diagram for illustrating an arrangement of a mobile apparatus according to the ninth embodiment of the present invention. As illustrated in FIG. 18, a mobile apparatus 900 according to this embodiment includes a cell reselection control unit 910, a battery saving mode determination unit 915, a six resource block (6RB) measurement unit 920, a 5 MHz bandwidth measurement unit 925, a system bandwidth measurement unit 930, a mode selection unit 935, a storage unit 940, a cell reselection determination unit 950 and a cell reselection execution unit 960.

The cell reselection control unit 910 controls cell reselection operations in the mobile apparatus 900 in an idle state as a whole. Specifically, the cell reselection control unit 910 indicates the 6RB measurement unit 920 to measure the radio conditions of the serving cell and the neighbor cell in a 1.08 MHz bandwidth in accordance with a predefined measurement cycle. In general, a DRX function can be applied to mobile apparatuses in the idle state for reduction in power consumption. Accordingly, if the DRX function is applied to the mobile apparatus 900 in the idle state, the cell reselection control unit 910 may set the measurement cycle depending on the DRX cycle length.

Furthermore, the cell reselection control unit 910 activates the 5 MHz bandwidth measurement unit 925 or the system bandwidth measurement unit 930 in a portion of measurement occasions specified by a set measurement cycle so as to regularly measure the radio conditions of the serving cell and the neighbor cell in a bandwidth greater than 1.08 MHz. For example, the cell reselection control unit 910 may activate the 5 MHz bandwidth measurement unit 925 or the system bandwidth measurement unit 930 in every X measurement occasions. The X value for specifying the switch frequency may be predefined constant or may be dynamically set by the mobile apparatus depending on the radio conditions and/or others. Determination which of the 5 MHz bandwidth measurement unit 925 and the system bandwidth measurement unit 930 is to be activated is made based on whether the battery saving mode is set to the mobile apparatus 900 as well as whether the system bandwidth forcing measurement mode is set. In general, it is desirable to use measurement results in a system bandwidth in cell reselection determination, but the measurement in the system bandwidth requires much power consumption. On the other hand, even if the measurement results in the 5 MHz bandwidth are used, interference can be estimated with an acceptable accuracy. Accordingly, when the mobile apparatus 900 is set to the battery saving mode, the measurement results in the 5 MHz bandwidth are used to determine whether to perform cell reselection. However, even if the mobile apparatus 900 is set to the battery saving mode, the mobile apparatus 900 may be set to forcibly measure the system bandwidth in a portion of wider band measurement occasions for the 5 MHz bandwidth to improve interference estimation accuracy (system bandwidth forcing measurement mode). For example, the cell reselection control unit 910 may activate the system bandwidth measurement unit 930 in every X' wider band measurement occasions by the 5 MHz bandwidth measurement unit 925. In this case, the radio conditions of the serving cell and the neighbor cell in the system bandwidth would be forcibly measured in every XX' measurement occasions specified by a set measurement cycle. Here, the X value for specifying the switch frequency may be a predefined constant or may be dynamically set by the mobile apparatus depending on the radio conditions and/or others. For example, if X'=2, the 5 MHz bandwidth measurement unit 925 and the system bandwidth measurement unit 930 would be alternately activated in every X measurement occasions. Accordingly, if the mobile apparatus 900 is set to the battery saving mode, it is possible to improve the interference estimation accuracy while reducing power consumption required to measure the radio conditions.

Upon receiving a request to determine whether the mobile apparatus 900 is set to the battery saving mode from the cell reselection control unit 910, the battery saving mode determination unit 915 determines whether a power mode of the mobile apparatus 900 is set to the battery saving mode. The power mode of the mobile apparatus 900 may be set by a user or may be dynamically set by the mobile apparatus depending on the radio conditions. If the battery saving mode is not set, the battery saving mode determination unit 915 notifies the cell reselection control unit 910 that the mobile apparatus 900 is not set to the battery saving mode. Upon receiving this notification, the cell reselection control unit 910 activates the system bandwidth control unit 910 to measure the interference with a higher accuracy and measure the radio conditions for the serving cell and the neighbor cell in the system bandwidth. On the other hand, if the battery saving mode is set, the battery saving mode determination unit 915 notifies the cell reselection control unit 910 that the mobile apparatus 900 is set to the battery saving mode. Upon receiving this notification, the cell reselection control unit 910 further inquires from the mode selection unit 935 whether the system bandwidth forcing measurement mode is set to the mobile apparatus 900.

Upon receiving a measurement mode determination signal from the cell reselection control unit 910, the mode selection unit 935 determines whether the system bandwidth forcing measurement mode is set to the mobile apparatus 900 and indicates the determination result to the cell reselection control unit 910. Upon receiving the notification from the mode selection unit 935 that the system bandwidth forcing measurement mode is set, the cell reselection control unit 910 activates the 5 MHz bandwidth measurement unit 925 in (X'−1) of X' wider band measurement occasions and the system bandwidth measurement unit 930 in one of the X' wider band measurement occasions. On the other hand, upon receiving an indication from the mode selection unit 935 that the system bandwidth forcing measurement mode is not set, the cell reselection control unit 910 activates the 5 MHz measurement unit 925 in all the wider band measurement occasions.

Upon receiving a measurement indication signal from the cell reselection control unit 910, the 6RB measurement unit 920 measures the radio conditions of the serving cell and the neighbor cell in a 1.08 MHz bandwidth corresponding to six resource blocks (RBs) and supplies the measured radio conditions in the storage unit 940. For example, the 6RB measurement unit 920 measures reception level of reference signals transmitted from individual base stations serving the serving cell and the neighbor cell in the 1.08 MHz bandwidth and determines reception quality RSRQ based on the measured reception level. The measured 1.08 MHz band is typically set such that the center frequency of the measurement band corresponds to the center frequency of the serving cell.

Upon receiving a measurement indication signal from the cell reselection control unit 910, the 5 MHz bandwidth measurement unit 925 measures the radio conditions of the serving cell and the neighbor cell in a 5 MHz bandwidth and supplies the measured radio conditions to the storage unit 940. For example, the 5 MHz bandwidth measurement unit 925 measures the reception level of reference signals transmitted from individual base stations serving the serving cell and the neighbor cell in a 5 MHz bandwidth and determines reception quality RSRQ based on the measured reception level. The measured 5 MHz band is typically set such that the center frequency of the measurement band corresponds to the center frequency of the serving cell.

Upon receiving a measurement indication signal from the cell reselection control unit 910, the system bandwidth measurement unit 930 measures the radio conditions of the serving cell and the neighbor cell in the system bandwidth and supplies the measured radio conditions to the storage unit 940. For example, the system bandwidth measurement unit 930 measures the reception level of reference signals transmitted from individual base stations serving the serving cell and the neighbor cell in the whole system bandwidth and determines reception quality RSRQ based on the measured reception level.

The storage unit 940 stores measurement results of radio quality supplied from the 6RB measurement unit 920, the 5 MHz bandwidth measurement unit 925 and the system bandwidth measurement unit 930 as well as various data for use in cell reselection operations. Also, in response to requests from other components in the mobile apparatus 900, the storage unit 940 supplies the stored data.

The cell reselection determination unit 950 uses the above-stated cell reselection determination criteria to determine whether to perform cell reselection from the serving cell to the neighbor cell based on the radio conditions of the serving cell and the neighbor cell measured by the 6RB measurement unit 920, the 5 MHz bandwidth measurement unit 925 and the system bandwidth measurement unit 930. Upon determining that the cell reselection from the serving cell to the neighbor cell is to be performed, the cell reselection determination unit 950 indicates the cell reselection execution unit 960 to initiate the cell reselection.

Upon receiving an indication to initiate the cell reselection from the serving cell to the neighbor cell from the cell reselection determination unit 950, the cell reselection execution unit 960 communicates to the base stations serving the serving cell and the neighbor cell and initiate the cell reselection to set the neighbor cell as a new serving cell.

Figure 19:
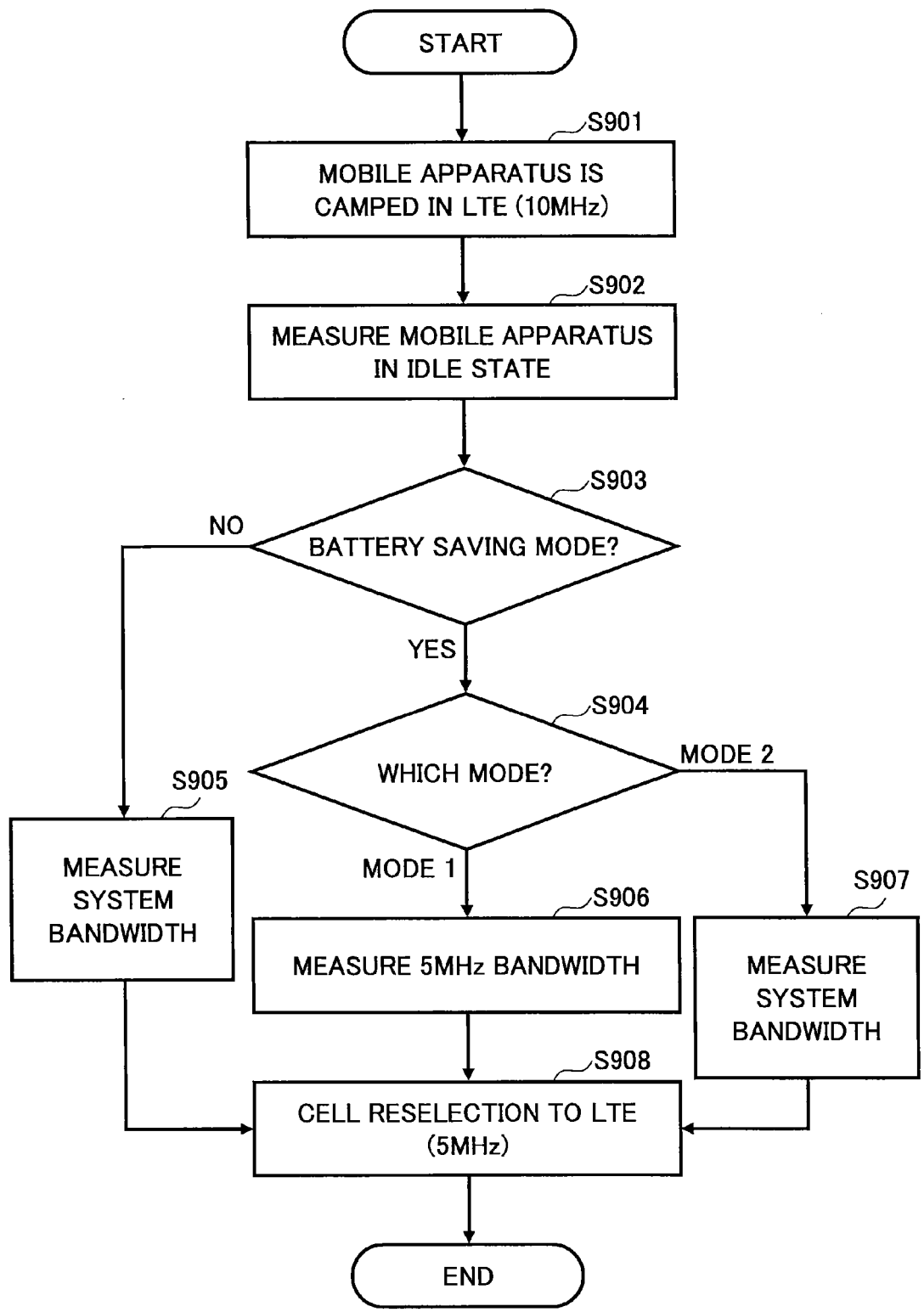
FIG. 19 is a flow diagram for illustrating a cell reselection operation in the mobile apparatus according to the ninth embodiment of the present invention.

FIG. 19 is a flow diagram for illustrating a cell reselection operation in the mobile apparatus according to the ninth embodiment of the present invention. As illustrated in FIG. 19, at step S901, the mobile apparatus 900 is camped in a 10 MHz LTE cell and sets that cell as a serving cell.

At step S902, when the mobile apparatus 900 transitions to the idle state, the cell reselection control unit 910 measures radio conditions of the serving cell and a neighbor cell in accordance with a predefined measurement cycle. As stated above, the cell reselection control unit 910 causes the 6RB measurement unit 920 to measure the radio conditions of the serving cell and the neighbor cell in a 1.08 bandwidth in each measurement occasion, while the cell reselection control unit 910 causes the 5 MHz bandwidth measurement unit 925 or the system bandwidth measurement unit 930 to measure the radio conditions of the serving cell and the neighbor cell in a 5 MHz bandwidth or a system bandwidth in every X measurement occasions. Determination as to which of the 5 MHz bandwidth measurement unit 925 and the system bandwidth measurement unit 930 is to be activated is made based on whether the mobile apparatus 900 is set to the battery saving mode as well as whether the system bandwidth forcing measurement mode is set to the mobile apparatus 900. To this end, the cell reselection control unit 910 inquires from the battery saving mode determination unit 915 whether the battery saving mode is set in every X measurement occasions.

At step S903, upon receiving a determination indication signal from the cell reselection control unit 910, the battery saving mode determination unit 915 determines whether the mobile apparatus 900 is set to the battery saving mode and indicates the determination result to the cell reselection control unit 910. If the mobile apparatus 900 is set to the battery saving mode (S903: YES), the cell reselection control unit 910 further inquires from the mode selection unit 935 whether the system bandwidth forcing measurement mode is set. On the other hand, if the mobile apparatus 900 is not set to the battery saving mode (S903: NO), the cell reselection control unit 910 activates the system bandwidth measurement unit 930 to measure interference with a higher accuracy.

At step S904, upon receiving a measurement mode determination signal from the cell reselection control unit 910, the mode selection unit 935 determines whether the system bandwidth forcing measurement mode is set to the mobile apparatus 900 and indicates the determination result to the cell reselection control unit 910. If the system bandwidth forcing measurement mode is not set (S904: Mode 1), the cell reselection control unit 910 activates the 5 MHz bandwidth measurement unit 925 in all wider band measurement occasions. On the other hand, if the system bandwidth forcing measurement mode is set (S904: Mode 2), the cell reselection control unit 910 activates the system bandwidth measurement unit 930 in every X' wider band measurement occasions.

At step S905, upon receiving a measurement indication signal from the cell reselection control unit 910, the system bandwidth measurement unit 930 measures the radio conditions of the serving cell and the neighbor cell in the system bandwidth.

At step S906, upon determining a measurement indication signal from the cell reselection control unit 910, the 5 MHz bandwidth measurement unit 925 measures the radio conditions of the serving cell and the neighbor cell in a 5 MHz bandwidth.

At step S907, upon receiving a measurement indication signal from the cell reselection control unit 910, the system bandwidth measurement unit 930 measures the radio conditions of the serving cell and the neighbor cell in the system bandwidth.

At step S908, the cell reselection determination unit 950 determines whether to initiate cell reselection based on radio quality of the serving cell and the neighbor cell measured by the 6RB measurement unit 920, the 5 MHz bandwidth measurement unit 925 and the system bandwidth measurement unit 930. Upon determining that the cell reselection from the serving cell to the neighbor cell is to be performed, the cell reselection determination unit 950 indicates the cell reselection execution unit 960 to initiate the cell reselection. Upon receiving this cell reselection indication signal, the cell reselection execution unit 960 performs the cell reselection to the indicated neighbor cell.

Next, a mobile apparatus according to the tenth embodiment of the present invention is described with reference to FIGS. 20 and 21. In this embodiment, a mobile apparatus camped in a 10 MHz LTE cell and presently communicating to a base station through an established RRC connection measures radio conditions of a serving cell and a neighbor cell by switching between a measurement band having a bandwidth of six resource blocks (that is, 1.08 MHz) and a wider system bandwidth or a 5 MHz measurement band at a predefined cycle and performs handover to the neighbor cell such as a 5 MHz LTE cell or a 3G cell based on the measured radio conditions. Here, determination as to which of the system bandwidth and the 5 MHz bandwidth is used as the measurement band is made based on whether a battery saving mode is set as well as whether a system bandwidth forcing measurement mode is set. If the system bandwidth forcing measurement mode is set, regular measurement in the system bandwidth is forcibly performed regardless of setting of the battery saving mode.

Figure 20:
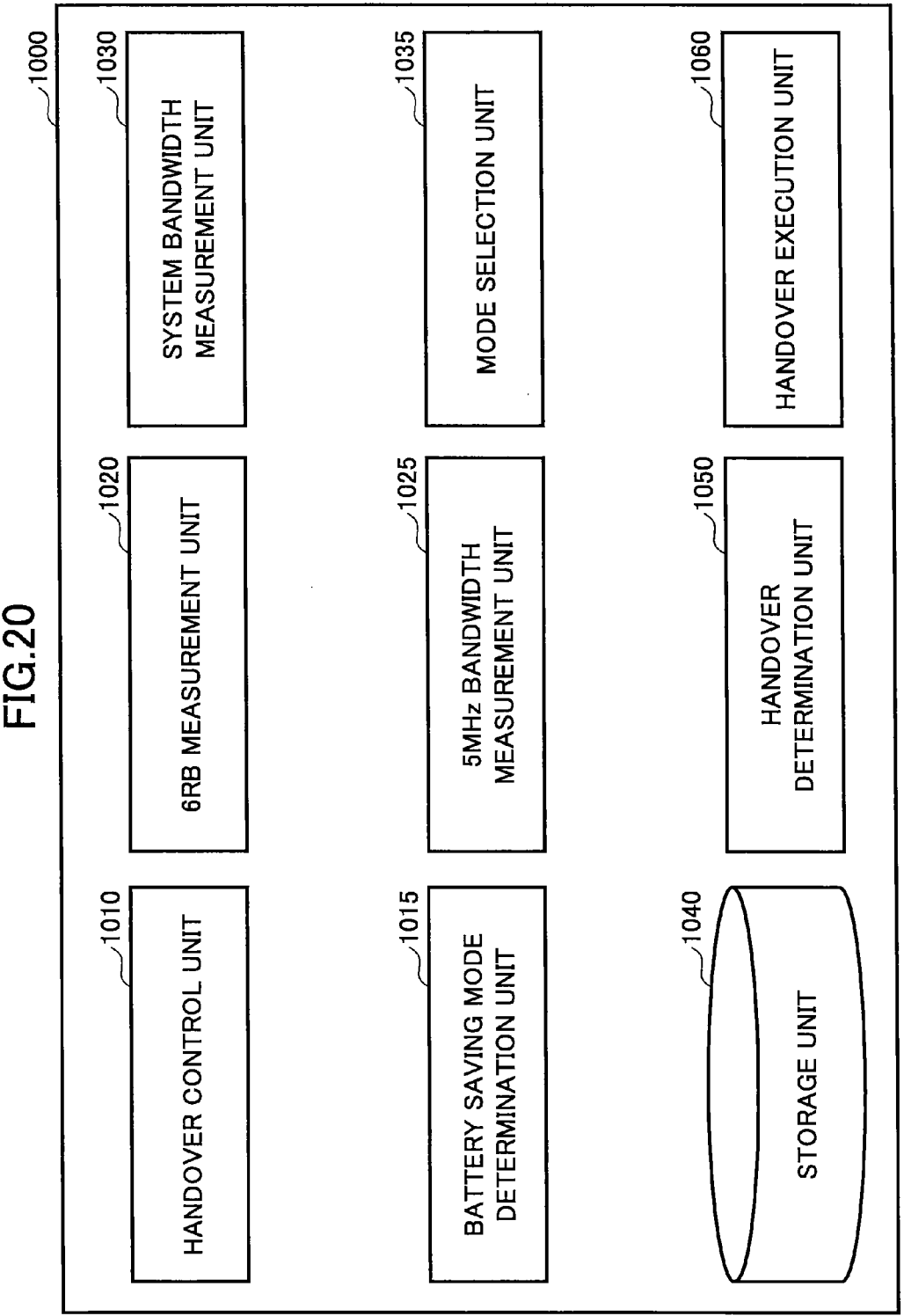
FIG. 20 is a block diagram for illustrating an arrangement of a mobile apparatus according to a tenth embodiment of the present invention.

FIG. 20 is a block diagram for illustrating an arrangement of a mobile apparatus according to the tenth embodiment of the present invention. As illustrated in FIG. 20, a mobile apparatus 1000 according to this embodiment includes a handover control unit 1010, a battery saving mode determination unit 1015, a six resource block (6RB) measurement unit 1020, a 5 MHz bandwidth measurement unit 1025, a system bandwidth measurement unit 1030, a mode selection unit 1035, a storage unit 1040, a handover determination unit 1050 and a handover execution unit 1060.

The handover control unit 1010 controls handover operations in the mobile apparatus 1000 presently communicating to a base station through an established RRC connection as a whole. Specifically, the handover control unit 1010 indicates the 6RB measurement unit 1020 to measure radio conditions of a serving cell and a neighbor cell in a 1.08 MHz bandwidth in accordance with a predefined measurement cycle. In general, mobile apparatuses measure the radio conditions of the presently communicating serving cell and neighbor cells at a predefined measurement cycle.

Furthermore, the handover control unit 1010 activates the 5 MHz bandwidth measurement unit 1025 or the system bandwidth measurement unit 1030 in a portion of measurement occasions specified by a set measurement cycle so as to regularly measure the radio conditions of the serving cell and the neighbor cell in a bandwidth greater than 1.08 MHz. For example, the handover control unit 1010 may activate the 5 MHz bandwidth measurement unit 1025 or the system bandwidth measurement unit 1030 in every X measurement occasions. The X value for specifying the switch frequency may be a predefined constant or may be dynamically set by the mobile apparatus depending on the radio conditions and/or others. Determination as to which of the 5 MHz bandwidth measurement unit 1025 and the system bandwidth measurement unit 1030 is to be performed is made based on whether the mobile apparatus 1000 is set to the battery saving mode as well as whether the system bandwidth forcing measurement mode is set. In general, it is desirable to use measurement results in the system bandwidth in handover determination, but the measurement in the system bandwidth requires much power consumption. On the other hand, even if measurement results in the 5 MHz bandwidth are used, interference can be estimated with an acceptable accuracy. Accordingly, when the mobile apparatus 1000 is set to the battery saving mode, the measurement results in the 5 MHz bandwidth are used to determine whether to perform handover. However, even if the mobile apparatus 1000 is set to the battery saving mode, the mobile apparatus 1000 may be set to forcibly measure the system bandwidth in a portion of wider band measurement occasions in the 5 MHz bandwidth to improve interference estimation accuracy (system bandwidth forcing measurement mode). For example, the handover control unit 1010 may activate the system bandwidth measurement unit 1030 in every X' wider band measurement occasions by the 5 MHz bandwidth measurement unit 1025. In this case, the radio conditions of the serving cell and the neighbor cell would be forcibly measured in the system bandwidth in every XX' measurement occasions specified by a set measurement cycle. Here, the X value for specifying the switch frequency may be a predefined constant or may be dynamically set depending on the radio conditions and/or others. For example, if X'=2, the 5 MHz bandwidth measurement unit 1025 and the system bandwidth measurement unit 1030 would be alternately activated in wider band measurement occasions each corresponding to every X measurement occasions. Accordingly, if the battery saving mode is set, it is possible to improve interference estimation accuracy while reducing power consumption required to measure the radio conditions.

Upon receiving a request to determine whether the mobile apparatus 1000 is set to the battery saving mode, the battery saving mode determination unit 1015 determines whether the power mode of the mobile apparatus 1000 is set to the battery saving mode. The power mode of the mobile apparatus 1000 may be set by a user or may be dynamically set by the mobile apparatus depending on the radio conditions. If the battery saving mode is not set, the battery saving mode determination unit 1015 notifies the handover control unit 1010 that the mobile apparatus 1000 is not set to the battery saving mode. Upon receiving this notification, the handover control unit 1010 activates the system bandwidth measurement unit 1030 to measure the interference with a higher accuracy and measures the radio conditions of the serving cell and the neighbor cell in a system bandwidth. On the other hand, if the battery saving mode is set, the battery saving mode determination unit 1015 notifies the handover control unit 1010 that the mobile apparatus 1000 is set to the battery saving mode. Upon receiving this notification, the handover control unit 1010 further inquires from the mode selection unit 1035 whether the system bandwidth forcing measurement mode is set to the mobile apparatus 1000.

Upon receiving a measurement mode determination signal from the handover control unit 1010, the mode selection unit 1035 determines whether the system bandwidth forcing measurement mode is set to the mobile apparatus 1000 and indicates the determination result to the handover control unit 1010. Upon receiving the notification from the mode selection unit 1035 that the system bandwidth forcing measurement mode is set, the handover control unit 1010 activates the 5 MHz bandwidth measurement unit 1025 in (X'−1) of X' wider band measurement occasions and the system bandwidth measurement unit 1030 in every X' wider measurement occasions. On the other hand, upon receiving the notification from the mode selection unit 1035 that the system bandwidth forcing measurement mode is not set, the handover control unit 1010 activates the 5 MHz bandwidth measurement unit 1025 in all the wider band measurement occasions.

Upon receiving a measurement indication signal from the handover control unit 1010, the 6RB measurement unit 1020 measures radio conditions of a serving cell and a neighbor cell in a 1.08 MHz bandwidth corresponding to six resource blocks (RBs) and supplies the measured radio conditions to the storage unit 1040. For example, the 6RB measurement unit 1020 measures reception level of reference signals transmitted from individual base stations serving the serving cell and the neighbor cell in a 1.08 MHz bandwidth and determines reception quality RSRQ based on the measured reception level. The measured 1.08 MHz band is typically set such that the center frequency of the measurement band corresponds to the center frequency of the serving cell.

Upon receiving a measurement indication signal from the handover control unit 1010, the 5 MHz bandwidth measurement unit 1025 measures the radio conditions of the serving cell and the neighbor cell in a 5 MHz bandwidth and supplies the measured radio conditions to the storage unit 1040. For example, the 5 MHz bandwidth measurement unit 1025 measures reception level of reference signals transmitted from individual base stations serving the serving cell and the neighbor cell in a 5 MHz bandwidth and determines reception quality RSRQ based on the measured reception level. The measured 5 MHz band is typically set such that the center frequency of the measurement band corresponds to the center frequency of the serving cell.

Upon receiving a measurement indication signal from the handover control unit 1010, the system bandwidth measurement unit 1030 measures the radio conditions of the serving cell and the neighbor cell in the system bandwidth and supplies the measured radio conditions to the storage unit 1040. For example, the system bandwidth measurement unit 1030 measures the reception level of reference signals transmitted from individual base stations serving the serving cell and the neighbor cell in the whole system band and determines reception quality RSRQ based on the measured reception level.

The storage unit 1040 stores measurement results of radio quality supplied from the 6RB measurement unit 1020, the 5 MHz bandwidth measurement unit 1025 and the system bandwidth measurement unit 1030 as well as various data for use in handover operations. Also, in response to requests from other components in the mobile apparatus 1000, the storage unit 1040 supplies the stored data.

The handover determination unit 1050 uses the above-stated handover determination criteria to determine whether to perform handover from the serving cell to the neighbor cell based on the radio conditions of the serving cell and the neighbor cell measured by the 6RB measurement unit 1020, the 5 MHz bandwidth measurement unit 1025 and the system bandwidth measurement unit 1030. Upon determining that the handover from the serving cell to the neighbor cell is to be performed, the handover determination unit 1050 indicates the handover execution unit 1060 to initiate the handover.

Upon receiving an indication to initiate the handover from the serving cell to the neighbor cell from the handover determination unit 1050, the handover execution unit 1060 communicates to the base stations serving the serving cell and the neighbor cell and performs the handover to set the neighbor cell as a new serving cell.

FIG. 21 is a flow diagram for illustrating a handover operation in the mobile apparatus according to the tenth embodiment of the present invention. As illustrated in FIG. 21, at step S1001, the mobile apparatus 1000 is camped in a 10 MHz LTE cell and sets that cell as a serving cell.

At step S1002, when the mobile apparatus 1000 establishes a RRC connection to a base station and transitions to a communication state, the handover control unit 1010 measures radio conditions of the serving cell and a neighbor cell being a handover candidate cell in accordance with a predefined measurement cycle. As stated above, the handover control unit 1010 causes the 6RB measurement unit 1020 to measure the radio conditions of the serving cell and the neighbor cell in a 1.08 MHz bandwidth in each measurement occasion, while the handover control unit 1010 cause the 5 MHz bandwidth measurement unit 1025 or the system bandwidth measurement unit 1030 to measure the radio conditions of the serving cell and the neighbor cell in a 5 MHz bandwidth or a system bandwidth in every X measurement occasions. Determination as to which of the 5 MHz bandwidth measurement unit 1025 and the system bandwidth measurement unit 1030 is to be activated is made based on whether the mobile apparatus 1000 is set to the battery saving mode as well as whether the system bandwidth forcing measurement mode is set to the mobile apparatus 1000. To this end, the handover control unit 1010 inquires from the battery saving mode determination unit 1015 whether the battery saving mode is set in every X measurement occasions.

At step S1003, upon receiving a determination indication signal from the handover control unit 1010, the battery saving mode determination unit 1015 determines whether the mobile apparatus 1000 is set to the battery saving mode and indicates the determination result to the handover control unit 1010. If the mobile apparatus 1000 is set to the battery saving mode (S1003: YES), the handover control unit 1010 further inquires from the mode selection unit 1035 whether the system bandwidth forcing measurement mode is set. On the other hand, if the mobile apparatus 1000 is set to the battery saving mode (S1003: NO), the handover control unit 1010 activates the system bandwidth measurement unit 1030 to measure interference with a higher accuracy.

At step S1004, upon receiving a measurement mode determination signal from the handover control unit 1010, the mode selection unit 1035 determines whether the system bandwidth forcing measurement mode is set to the mobile apparatus 1000 and indicates the determination result to the handover control unit 1010. If the system bandwidth forcing measurement mode is not set (S1004: Mode 1), the handover control unit 1010 activates the 5 MHz bandwidth measurement unit 1025 in all wider band measurement occasions. On the other hand, if the system bandwidth forcing measurement mode is set (S1004: Mode 2), the handover control unit 1010 activates the system bandwidth measurement unit 1030 in every X' wider band measurement occasions.

At step S1005, upon receiving a measurement indication signal from the handover control unit 1010, the system bandwidth measurement unit 1030 measures the radio conditions of the serving cell and the neighbor cell in the system bandwidth.

At step S1006, upon receiving a measurement indication signal from the handover control unit 1010, the 5 MHz bandwidth measurement unit 1025 measures the radio conditions of the serving cell and the neighbor cell in the 5 MHz bandwidth.

At step S1007, upon receiving a measurement indication signal from the handover control unit 1010, the system bandwidth measurement unit 1030 measures the radio conditions of the serving cell and the neighbor cell in the system bandwidth.

At step S1008, the handover determination unit 1050 determines whether to perform handover based on radio quality of the serving cell and the neighbor cell measured by the 6RB measurement unit 1020, the 5 MHz bandwidth measurement unit 1025 and the system bandwidth measurement unit 1030. Upon determining that the handover from the serving cell to the neighbor cell is to be performed, the handover determination unit 1050 indicates the handover execution unit 1060 to perform the handover. Upon receiving this handover indication signal, the handover execution unit 1060 initiates the handover to the indicated neighbor cell.

In the above-stated embodiments, the RSRQ is used as an indicator indicative of the radio conditions, but the present invention is not limited to it. Any other appropriate indicator such as a RSRP (Reference Signal Received Power) or a RSSI (Received Signal Strength Indicator) may be used.

Also, in the above-stated embodiments, the 1.08 MHz bandwidth is used as a measurement band normally measured in each measurement occasion. However, the present invention is not limited to it, and any other appropriate bandwidth greater than or equal to a lowest bandwidth defined in standard of an applied radio communication system preferable from the viewpoint of battery saving may be used. Also, the 5 MHz bandwidth is used as a measurement bandwidth wider than the normally used measurement bandwidth. However, the present invention is not limited to it, and any other appropriate bandwidth greater than the normally used measurement bandwidth and smaller than the system bandwidth may be used. Preferably, the wider band measurement bandwidth is set to a guard interval (ex. 0.96 MHz) for any appropriate bandwidth greater than a 5 MHz LTE cell or a 3G cell serving as a neighbor cell.

Although the specific embodiments of the present invention have been described in detail, the present invention is not limited to the above-stated embodiments, and various variations and modifications can be made within the spirit and scope of the present invention as defined in claims.

This international patent application is based on Japanese Priority Application No. 2011-082929 filed on Apr. 4, 2011, the entire contents of which are hereby incorporated by reference.

LIST OF REFERENCE SYMBOLS 100, 200, 300, 400, 500, 600, 700, 800, 900, 1000: mobile apparatus
110, 310, 510, 710, 910: cell reselection control unit
210, 410, 610, 810, 1010: handover control unit
120, 220, 320, 420, 520, 620, 720, 820, 920, 1020: 6RB measurement unit
125, 225, 325, 425, 525, 625, 725, 825, 925, 1025: 5 MHz bandwidth measurement unit
130, 230, 330, 430, 530, 630, 730, 830, 930, 1030: system bandwidth measurement unit

The invention claimed is:

1. A mobile apparatus, comprising:
a first bandwidth measurement unit configured to measure reception qualities of a serving cell and a neighbor cell in a first bandwidth;
a second bandwidth measurement unit configured to measure the reception qualities of the serving cell and the neighbor cell in a second bandwidth greater than the first bandwidth;
a control unit configured to selectively activate the first bandwidth measurement unit and the second bandwidth measurement unit; and
a cell transition unit configured to perform cell transition from the serving cell to the neighbor cell based on the reception qualities of the serving cell and the neighbor cell measured by the first bandwidth measurement unit and the second bandwidth measurement unit,
wherein the control unit switches between the first bandwidth measurement unit and the second bandwidth measurement unit at every one of a predetermined number of measurement occasions specified by a first switch frequency.

2. The mobile apparatus as claimed in claim 1, further comprising:
a third bandwidth measurement unit configured to measure the reception qualities of the serving cell and the neighbor cell in a third bandwidth having a width between the first bandwidth and the second bandwidth; and
a battery remaining amount determination unit configured to detect a battery remaining amount of the mobile apparatus and determine whether the detected battery remaining amount is less than or equal to a predefined threshold,
wherein when the battery remaining amount determination unit determines that the detected battery remaining amount is less than or equal to the predefined threshold, the control unit switches between the first bandwidth measurement unit and the third bandwidth measurement unit at the first switch frequency, and the cell transition unit performs the cell transition from the serving cell to the neighbor cell further based on the reception qualities of the serving cell and the neighbor cell measured by the third bandwidth measurement unit.

3. The mobile apparatus as claimed in claim 2, further comprising:
a mode selection unit configured to determine whether the mobile apparatus is set to a second bandwidth forcing measurement mode,
wherein when the mode selection unit determines that the mobile apparatus is set to the second bandwidth forcing measurement mode, the control unit switches between the second bandwidth measurement unit and the third bandwidth measurement unit at a second switch frequency lower than the first switch frequency.

4. The mobile apparatus as claimed in claim 1, further comprising:
a third bandwidth measurement unit configured to measure the reception qualities of the serving cell and the neighbor cell in a third bandwidth having a width between the first bandwidth and the second bandwidth; and
a battery saving mode determination unit configured to determine whether the mobile apparatus is set to a battery saving mode,
wherein when the battery saving mode determination unit determines that the mobile apparatus is set to the battery saving mode, the control unit switches between the first bandwidth measurement unit and the third bandwidth measurement unit at the first switch frequency, and the cell transition unit performs the cell transition from the serving cell to the neighbor cell further based on the reception qualities of the serving cell and the neighbor cell measured by the third bandwidth measurement unit.

5. The mobile apparatus as claimed in claim 4, further comprising:
a mode selection unit configured to determine whether the mobile apparatus is set to a second bandwidth forcing measurement mode,
wherein when the mode selection unit determines that the mobile apparatus is set to the second bandwidth forcing measurement mode, the control unit switches between the second bandwidth measurement unit and the third bandwidth measurement unit at a second switch frequency lower than the first switch frequency.

6. A method in a mobile apparatus, comprising:

measuring reception qualities of a serving cell and a neighbor cell in a first bandwidth a predefined number of times;

measuring the reception qualities of the serving cell and the neighbor cell in a second bandwidth greater than the first bandwidth; and performing cell transition from the serving cell to the neighbor cell based on the reception qualities of the serving cell and the neighbor cell measured in the first bandwidth and the second bandwidth, wherein the measuring reception qualities of the serving cell and the neighbor cell in the first bandwidth and the measuring the reception qualities of the serving cell and the neighbor cell in the second bandwidth are switched at every one of a predetermined number of measurement occasions specified by a first switch frequency.

7. A mobile apparatus, comprising:

circuitry configured to control measurement of reception qualities of a serving cell and a neighbor cell in a first bandwidth, control measurement of the reception qualities of the serving cell and the neighbor cell in a second bandwidth greater than the first bandwidth, selectively activate the first bandwidth measurement and the second bandwidth measurement, and perform cell transition from the serving cell to the neighbor cell based on the reception qualities of the serving cell and the neighbor cell measured by the first bandwidth measurement and the second bandwidth measurement, wherein the circuitry switches between the first bandwidth measurement and the second bandwidth measurement at every one of a predetermined number of measurement occasions specified by a first switch frequency.

8. The mobile apparatus as claimed in claim 7, wherein the circuitry is further configured to control measurement of the reception qualities of the serving cell and the neighbor cell in a third bandwidth having a width between the first bandwidth and the second bandwidth, and detect a battery remaining amount of the mobile apparatus and determine whether the detected battery remaining amount is less than or equal to a predefined threshold, wherein when the circuitry determines that the detected battery remaining amount is less than or equal to the predefined threshold, the circuitry switches between the first bandwidth measurement and the third bandwidth measurement at the first switch frequency, and the circuitry performs the cell transition from the serving cell to the neighbor cell further based on the reception qualities of the serving cell and the neighbor cell.

9. The mobile apparatus as claimed in claim 8, wherein the circuitry is further configured to determine whether the mobile apparatus is set to a second bandwidth forcing measurement mode, wherein when the circuitry determines that the mobile apparatus is set to the second bandwidth forcing measurement mode, the circuitry switches between the second bandwidth measurement and the third bandwidth measurement at a second switch frequency lower than the first switch frequency.

10. The mobile apparatus as claimed in claim 7, wherein the circuitry is further configured to control measurement of the reception qualities of the serving cell and the neighbor cell in a third bandwidth having a width between the first bandwidth and the second bandwidth; and determine whether the mobile apparatus is set to a battery saving mode, wherein when the circuitry determines that the mobile apparatus is set to the battery saving mode, the circuitry switches between the first bandwidth measurement and the third bandwidth measurement at the first switch frequency, and the circuitry performs the cell transition from the serving cell to the neighbor cell further based on the reception qualities of the serving cell and the neighbor cell.

11. The mobile apparatus as claimed in claim 10, wherein the processing circuitry is further configured to determine whether the mobile apparatus is set to a second bandwidth forcing measurement mode, wherein when the circuitry determines that the mobile apparatus is set to the second bandwidth forcing measurement mode, the circuitry switches between the second bandwidth measurement and the third bandwidth measurement at a second switch frequency lower than the first switch frequency.

* * * * *